(12) United States Patent
Dominic

(10) Patent No.: US 8,086,747 B2
(45) Date of Patent: Dec. 27, 2011

(54) GROUP-TO-GROUP COMMUNICATION OVER A SINGLE CONNECTION

(75) Inventor: Anilkumar Dominic, San Jose, CA (US)

(73) Assignee: Anilkumar Dominic, San Jose, CA (US)

( * ) Notice: Subject to any disclaimer, the term of this patent is extended or adjusted under 35 U.S.C. 154(b) by 483 days.

(21) Appl. No.: 10/942,763

(22) Filed: Sep. 15, 2004

(65) Prior Publication Data

US 2005/0066056 A1 Mar. 24, 2005

Related U.S. Application Data

(60) Provisional application No. 60/505,099, filed on Sep. 22, 2003.

(51) Int. Cl.
*G06F 15/16* (2006.01)
(52) U.S. Cl. .......................... 709/230; 709/238; 709/204
(58) Field of Classification Search .................. 709/230, 709/236, 245
See application file for complete search history.

(56) References Cited

U.S. PATENT DOCUMENTS

| | | | | |
|---|---|---|---|---|
| 6,507,863 B2 * | 1/2003 | Novaes | ........................... | 709/201 |
| 6,532,233 B1 * | 3/2003 | Matsunaga et al. | ........... | 370/390 |
| 6,580,722 B1 * | 6/2003 | Perlman | ........................ | 370/432 |
| 6,614,808 B1 * | 9/2003 | Gopalakrishna | ............... | 370/469 |
| 6,665,304 B2 * | 12/2003 | Beck et al. | ..................... | 370/401 |
| 6,801,949 B1 | 10/2004 | Bruck et al. | | |
| 6,820,133 B1 | 11/2004 | Grove et al. | | |
| 6,826,752 B1 * | 11/2004 | Thornley et al. | ............... | 718/100 |
| 6,829,637 B2 | 12/2004 | Kokku et al. | | |
| 6,839,348 B2 * | 1/2005 | Tang et al. | ..................... | 370/390 |
| 6,891,837 B1 * | 5/2005 | Hipp et al. | ..................... | 370/397 |
| 6,912,590 B1 * | 6/2005 | Lundback et al. | ............ | 709/238 |
| 7,111,035 B2 * | 9/2006 | McClellan et al. | ........... | 709/201 |
| 7,149,678 B2 * | 12/2006 | Gurevich et al. | ............... | 703/22 |
| 7,292,584 B1 * | 11/2007 | Rautiainen et al. | ........... | 370/399 |
| 7,353,495 B2 * | 4/2008 | Somogyi | ........................ | 717/120 |
| 7,359,973 B2 * | 4/2008 | Chiles et al. | ................... | 709/228 |
| 7,711,831 B2 * | 5/2010 | Aiken et al. | ................... | 709/228 |
| 2001/0053156 A1 * | 12/2001 | Higuchi et al. | ............... | 370/466 |
| 2002/0107954 A1 * | 8/2002 | Ferguson et al. | ............. | 709/224 |
| 2003/0126464 A1 * | 7/2003 | McDaniel et al. | ............ | 713/201 |

(Continued)

OTHER PUBLICATIONS

Deering, "Host Extensions for IP Multicasting", Network Working Group, RFC 1112, Aug. 1989.*

(Continued)

*Primary Examiner* — Yemane Mesfin
*Assistant Examiner* — Thomas Richardson
(74) *Attorney, Agent, or Firm* — Fenwick & West

(57) ABSTRACT

A system enabled for reliable and ordered data communication between two sets of nodes with atomic multi-point delivery and multi-point transmission, for example, extending TCP/IP is described hereon. The transmission control protocol (TCP/IP) is intended for reliable host-to-host communication [RFC 793]. The invention extends TCP's notion of host-to-host communication to symmetric group-to-group communication maintaining TCP specifications for data traffic between the groups. The current definition of, two end-points of a TCP connection is extended to two groups of endpoints, communicating over the connection. End-points of a connection terminate at group nodes. When multiple nodes must be delivered with data, the delivery is performed atomically. Of data originating multiple nodes, optionally, a single data instance is transmitted. Each endpoint is comprised of a receiveHead and a sendHead operating independently. The receiveHead controls delivery of incoming data to application socket and sendHead controls transmission.

15 Claims, 18 Drawing Sheets

U.S. PATENT DOCUMENTS

| | | | | |
|---|---|---|---|---|
| 2003/0147390 A1* | 8/2003 | Rizzo et al. | | 370/390 |
| 2003/0174706 A1* | 9/2003 | Shankar et al. | | 370/393 |
| 2003/0233540 A1* | 12/2003 | Banerjee et al. | | 713/153 |
| 2004/0107234 A1* | 6/2004 | Rajahalme | | 709/200 |
| 2004/0148421 A1* | 7/2004 | Achtermann et al. | | 709/232 |
| 2005/0066035 A1* | 3/2005 | Williams et al. | | 709/226 |
| 2007/0110046 A1* | 5/2007 | Farrell et al. | | 370/389 |

OTHER PUBLICATIONS

Aron, M. et al., "Scalable Content-Aware Request Distribution in Cluster-Based Network Servers," to appear in Proc. of the 2000 Annual Usenix Technical Conference, Jun. 2000, 14 pages, San Diego, CA.

Becker, T., "Application-Transparent Fault Tolerance in Distributed Systems," Proceedings $2^{nd}$ International Workshop on Configurable Distributed Systems, Mar. 21-23, 1994, pp. 36-45, Pittsburgh, PA.

"Emic Application Cluster: Administrator's Guide," Emic Networks, Jan. 2003, 108 pages.

"Emic Application Cluster: Administrator's Guide," Emic Networks, Jan. 2003, 115 pages.

"Emic Application Cluster for Apache," Emic Application Cluster, 2002-2003, 2 pages.

"Emic Application Cluster for MySQL," Emic Application Cluster, 2002-2003, 2 pages.

"Emic Application Cluster 2.0 for MySQL," Emic Networks, 2003, 2 pages.

"Emic Application Cluster 2.0 for MySQL, Architecture White Paper," Emic Networks, Nov. 2003, 10 pages.

"Fault Tolerance and Load Balance Clustering for Apache," Emic Networks, Jan. 2003, 12 pages.

"Fault Tolerance and Load Balance Clustering for Apache," Emic Networks, Jul. 2003, 12 pages.

"Fault Tolerance and Load Balance Clustering for MySQL," Emic Networks, Jan. 2003, 23 pages.

"Fault Tolerance and Load Balance Clustering for MySQL White Paper," Emic Networks, Jan. 2003, 23 pages.

"Fault Tolerance and Load Balance Clustering for MySQL White Paper," Emic Networks, Sep. 2003, 23 pages.

Introduction to TCP/IP, Feb. 2, 1995, [online] [Retrieved on Aug. 18, 2003] Retrieved from the Internet <URL:http://pclt.cis.yale.edu/pclt/COMM/TCPIP.HTM>.

Kokku, R. et al., "Half-Pipe Anchoring: An Efficient Technique for Multiple Connection Handoff," pp. 1-20.

Kokku, R. et al., "Half-Pipe Anchoring: An Efficient Technique for Multiple Connection Handoff," pp. 1-25.

Gemmell, J. et al., "The PGM Reliable Multicast Protocol," Network, IEEE, Dec. 2001, pp. 1-13, vol. 17, Issue 1.

Liang, S., "TCP-SMO: Extending TCP to Support Medium-Scale Multicast Applications," INFOCOM 2002, Twenty-First Annual Joint Conference of the IEEE Computer and Communication Proceedings, IEEE, 2002, pp. 1-10, vol. 3.

Liang, S., "Unifying the Transport Layer of a Packet-Switched Internetwork," Dissertation, Department of Electrical Engineering, Stanford University, Mar. 2003, 158 pages.

Talpade, R. et al., "Single Connection Emulation (SCE): An Architecture for Providing a Reliable Multicast Transport Service," 1994, 13 pages.

* cited by examiner

GROUP-TO-GROUP COMMUNICATION OVER A SINGLE CONNECTION

CROSS REFERENCE TO RELATED APPLICATIONS

This application claims the benefit of U.S. Provisional Application No. 60/505,099, filed Sep. 22, 2003; which is incorporated by reference in its entirety.

This application is related to the co-pending U.S. application Ser. No. 10/942,260, entitled "A Fault Tolerant Symmetric Multi-Computing System," (Inventor: Anilkumar Dominic), filed Sep. 15, 2004, which is herein incorporated by reference in its entirety.

BACKGROUND OF THE INVENTION

1. Field of the Invention

The present invention relates to network communications between n-to-n points in a network, where n is any integer value.

2. Brief Description of the Related Arts

For the optimal resource utilization, flexibility and reduced management costs the industry demands solutions based on a "utility computing" model where processing power and storage capacity can be added as need and resources are provisioned dynamically to meet changing needs. Conventional mainframe solutions are beyond the reach of average enterprises due to high cost. There are large number of high performance but low-cost "blade servers" and networking technologies available in the market. However, a solution that aggregates these resources efficiently and flexibly and can run wide range of applications to meet the utility computing needs does not exist today.

The client-server paradigm is popular in the industry due to its simplicity in which a client makes a request and server responds with an answer. To enable this paradigm, a popular communications protocol used between a client and a server in a communication network is, transmission control protocol/Internet Protocol, or simply, "TCP/IP." In the communication network, a client (or client system or machine) views a server (or server system or machine) as a single logical host or entity. A single physical server is often incapable of effectively servicing large number of clients. Further, a failed server leaves clients inoperable.

To address the shortcomings of a single physical server, cluster configurations having many servers running in parallel or grid to serve clients were developed using load-balancers. These configurations provide potential benefits, such as, fault-tolerance, lower cost, efficiency and flexibility comparable to mainframes. However, these and other benefits remain largely unrealized due to their inherent limitations and lack of a standard platform most applications can build on.

In addition to physical clustering, conventional software systems have also made efforts to introduce clustering at application level and operating system levels. However, shortcomings of such software configurations include instances where clustering is embedded in the application results in limited usage of those applications. Similarly, although operating system level clustering is attractive, conventional efforts in these areas have not been successful due to large number of abstractions that must be virtualized.

In contrast to physical server and software application and operating system clustering, network level clustering does not suffer from either of the problems and provides some attractive benefits. For example, the ability to address the cluster of server nodes as a single virtual entity is a requirement to be useful in client server programming. Further, the ability to easily create virtual clusters with a pool of nodes adds to better utilization and mainframe class flexibility.

A conventional network level-clustering platform must be generic and usable by a wide range of applications. These applications range from, web-servers, storage servers, database servers, scientific and application grid computing. These conventional network level clusters must enable aggregation of compute power and capacity of nodes, such that applications scale seamlessly. Existing applications must be able to be run with minimal no or changes. However, conventional network level clusters have had only limited success.

To the extent there has been any success of the Symmetric Multi-Processor (SMP) architecture, it can be attributed to the simplicity of the bus, which made processor and memory location transparent to applications. For clustering too, simplicity of a virtual bus connecting server nodes provides node location transparency and node identity transparency. However, such conventional systems lack the capability of allowing a bus to be directly tapped by client applications for efficiency. Similarly, buses based on User Datagram Protocol ("UDP") packet broadcast and multicast lack data delivery guarantees, resulting in application level clustering.

The single most used protocol with delivery guarantees by the industry is TCP/IP. The TCP's data delivery guarantee, ordered delivery guarantee and ubiquity, makes it particularly desirable for virtualization. However, TCP's support for just two-end points per connection has limited its potential. Asymmetrical organization of processing elements/nodes that have pre-assigned tasks such as distributing incoming requests to cluster are inherently inflexible and difficult to manage and balance load. Asymmetrical nodes are often single point of failures and bottlenecks. In order for MC (Multi Computing) to succeed, there is a need for symmetrical organization as opposed asymmetrical node organization.

Another problem with asymmetry in a client-server environment is latency. Switches and routers employ specialized hardware to reduce latency of data passing through. When data must pass through node's UDP/TCP/IP stack, it adds significant latency due to copying and processing. Hence, in order to achieve optimal performance, systems must avoid passing of data through intervening nodes having asymmetric organization. However, if a server node's CPUs must handle large amount of network traffic, application throughput and processing suffers. Thus, conventional systems must use hardware accelerators such as specialized adaptor cards or Integrated Circuit chips to reduce latency at the endpoints and improve application performance. This increases system costs and complexity.

Low-cost fault-tolerance is a is highly desired by many enterprise applications. Solutions where fixed number of redundant hardware components are used suffer from lack of flexibility, lack of ability to repair easily and higher cost due to complexity. Solutions today offer high availability by quickly switching services to a stand-by server after fault occurred. As the stand-by systems are passive its resources only not utilized resulting in higher cost. In the simplest yet powerful form of fault tolerance by replication, the service over a connection continue without disruption upon failure of nodes.

On traditional clusters, an active node performs tasks and passive nodes later update with changes. In many instances, there are fewer updates compared to other tasks such as query. Machines are best utilized when load is shared among all replicas while updates are reflected on replicas. Replica updates must be synchronous and must be made in the same order for consistency. With atomic delivery, data is guaranteed delivered to all target endpoints before client is sent with a TCP ACK indicating the data receipt. In the event of a replica failure, remainder of the replicas can continue service avoiding connection disruption to effect fault-tolerance. Non atomic replication lacks usability. Specifically, when a client request is received by replicas of a services, each produce a response. As client views server as a single entity it must be made sure that only one instance of the response is sent back to client. Similarly, when multiple client replicas attempt to send same request, it must be made sure that only one instance is sent out to server. Conventional systems often fail to provide atomicity, and therefore, lack usability and fault tolerance avoding connection disruption.

Another problem with conventional clustering systems is load balancing. As with any system, the ability balance load evenly among nodes is necessary for optimal application performance. However, conventional clustering systems provide only limited support for standard load balancing schemes, for example, round-robin, content hashed, and weighted priority. Moreover, many conventional clustering systems are unable to support implementing application specific load-balancing schemes.

Many services have load levels varying significantly in a cluster depending on time. Running processes may need to be migrated for retiring an active server. Conventional cluster systems often lack support for adding or removing nodes/replicas to cluster in a manner that is easily performed and without disrupting the service.

A number of attempts have been made to address network level virtualization. However, each attempt has still resulted in significant shortcomings. For example, one conventional solution is a device for balancing load in a cluster of Web-Servers is popular in the industry. This load-balancing device, which is also disclosed in U.S. Pat. Nos. 6,006,264 and 6,449,647, switches incoming client TCP connections to a server in a pool of servers. A conventional server for this process is Microsoft's Network Load balancer software, which broadcasts or multicasts client packets to all nodes by a switch or router. However, once a connection is mapped, the same server handles all client requests for the life of TCP connection in a conventional one-to-one relationship.

A problem with conventional systems such as the ones above is when a service is comprised of different types of tasks running on nodes, it fails to provide a complete solution because any mapped server that would not run all services client would request over a connection results in service failure. This limits the use of such systems to web-page serving in which only one task of serving pages is replicated to many nodes. In addition, any mapping of devices implemented external to a server is a bottleneck and results in a single point of failure. Further, because a connection has only two end points, replication is not supported. Therefore, with such single ended TCP, updates are not reflected on replicas, and hence, there are considerable limits on usability.

To address some of the shortcomings of the above conventional systems, other conventional systems attempted to distribute client requests over a connection to nodes serving different tasks. Ravi Kokku et al disclosed one such system, in their article "Half Pipe Anchoring." Half pipe anchoring was based on backend forwarding. In this scheme when a client request arrives in the cluster of servers, a designated server accept the requests and after examination of the data, forwards to an optimal server. The optimal server, given with connection state information later responds to the client directly after altering the addresses to mach the original target address. Here a single TCP end-point is dynamically mapped to nodes to distribute requests. This scheme is an example of "asymmetric" approach in that an intervening node intercepts the data and distribute it based on data content.

Another conventional system attempting to achieve asymmetric organization is disclosed in two whitepapers written by EMIC Networks. Inc. In this conventional system, a designated node intercepts and captures incoming data and later reliably delivers it to multiple nodes, using proprietary protocols. Sometimes only one node is permitted to transmit data, and data must be transmitted first to a designated server which later retransmits it to client. Here also the single end-point is dynamically mapped and the TCP connection terminates at the intervening node where replication is initiated. This scheme is another example of "asymmetric" approach in that an intervening node intercepts the data and replicate it.

Both schemes described above maintain the TCP definition of two endpoints, although they may be mapped to different nodes. Replication in these conventional schemes is performed at the application level using proprietary protocols. Further, these conventional schemes employ asymmetric node organization, where select nodes act as application level router that distributes requests. However, such asymmetry results in scalability limitations as noted in "Scalable Content Aware Request Distribution in Cluster Based Network Servers" by Aaron et al. These limitations include a single point of failure, data throughput bottlenecks, suboptimal performance due to higher latency, and lack of location transparency.

Therefore, there is a need for a symmetric system and a method for using the current definition of TCP's two endpoints to provide m-to-n connections (m, n, being any integer, which may be the same or different).

SUMMARY OF THE INVENTION

The above mentioned and other requirements are met by extending TCP's current scope of host-to-host communication to group-to-group communication, more specifically extending current definition of two connection endpoints, to two groups of endpoints spanning symmetrically organized nodes. Each such endpoint is entitled to receive and transmit independently and in parallel while maintaining TCP's ordered transmission. Data is delivered to whole group or a subset depending on the configuration. Only necessary target end-points are required to have received the data, before TCP's ACK is sent to peer group.

In one embodiment, the present invention allows for addressing a cluster of nodes as a single virtual entity with one or more IP addresses. The communication between the client group and the server group is strictly standards based in that any standard TCP/IP endpoint is able to seamlessly communicate with the group. The data is delivered atomically to the endpoints terminating at symmetrically organized nodes of the group.

Filters installed at the connection endpoints filter out arriving data uninteresting to application segments. Data delivery to the application segments are dynamically controlled by the filters configured and installed appropriately. Additionally the filter optionally performs placement of incoming data directly into target application memory without intervening copies.

The input and output over a connection is decoupled in that nodes may receive and transmit independent of each other and in parallel. All transmissions are sequential per TCP specification, and transmission control among nodes are ordered based on round-robin among group nodes or round-robin among transmit requestors, or application specific schemes. Nodes may re-transmit in parallel and require no additional synchronizations between them to do so.

For scalability and load sharing, application functions are distributed among group nodes. To achieve this, an application is logically segmented, each running a subset of the application functions. Incoming requests arriving on a TCP connection are then delivered to the segments that reside over the group effectively distributing load. By delivering only certain set of requests to application instances, a logical segmentation may be achieved without application code change. Application segments may be migrated from node to node dynamically without connection disruption.

In addition, it is noted that a node may communicate with other nodes of a group by creating a connection to the virtual entity represented by the group. This provides all the above features for communication between group nodes.

Optional filter at receiveHead filters out data uninteresting to application at the arrival, to reduce processor and memory and bus bandwidth usage. The filtration scheme examines input packet to determine if data must be passed in or not. Data targeted to multiple nodes, are delivered atomically that the acknowledgement is sent to the peer group only after all target end points are guaranteed to have received it. Applications wishing to transmit data invokes sendHead, to control, serialize, maintain transmission record boundaries and to follow TCP specifications correctly. To serialize transmission control, the sendHead holding latest and greatest connection state information is passed to node needing transmission. Nodes may join or leave service over a connection as dictated by the application.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. ("FIG.") 1a is a generalized diagram of communication system constructed in accordance with one embodiment of the present invention.

DETAILED DESCRIPTION OF THE INVENTION

The present invention includes a system enabled for reliable and ordered data communication between two sets of nodes with atomic multi-point delivery and multi-point transmission, for example, extending TCP/IP. The present invention extends TCP's notion of reliable host-to-host communication to include symmetric group-to-group communication maintaining TCP specifications for data traffic between the groups. Further, the present invention extends the definition of two endpoints of a TCP connection to now include at least two groups of endpoints that are communicating over the single connection.

In the present invention, end-points of a connection terminate at group nodes. When multiple nodes must be delivered with data, the delivery is performed atomically. Optionally, with respect to data originating from multiple nodes a single data instance is transmitted. As will be further described below, each endpoint is comprised of a receiveHead and a sendHead operating independently.

Introduction

In one embodiment of the present invention, a node includes a connection on a network, for example, a data processing device such as general purpose computers or other device having a microprocessor or software configured to function with a data processing device for network related communications. A group refers to a collection of one or more nodes organized symmetrically. An application segment refers to the application or a segment of an application that may serve in conjunction with other application segments running on various group nodes. An application is comprised of one or more application segments and an application segment is comprised of one or more processes.

A sendHead refers to a transmitting end of a TCP connection, which controls data transmission and maintains the transmission state at the node. A receiveHead refers to the receiving end of a TCP connection, which controls data reception on connection and maintains data reception state at the node. An active sendHead refers to the sendHead that is designated to have latest transmission state information, for example, sequence number of data and sequence number of last acknowledgement.

A bus controller refers to a node that controls and/or coordinates connection establishment and termination process with the peer group. A signal refers to a message exchanged within a node group over a logical bus. When a source and a target of a signal are within a same node, no signal is sent out, although it may amount to the effect of receiving it internally. An end-point of a connection refers to stack such as TCP, that exchanges data with the peer in sequential order based on a pair of sequence numbers agreed beforehand. An end-point of a connection has at least an output data stream origination point and input data stream termination point. A request refers to a select segment of incoming data stream, for example, a client request for service.

System Overview

Figure 1A:
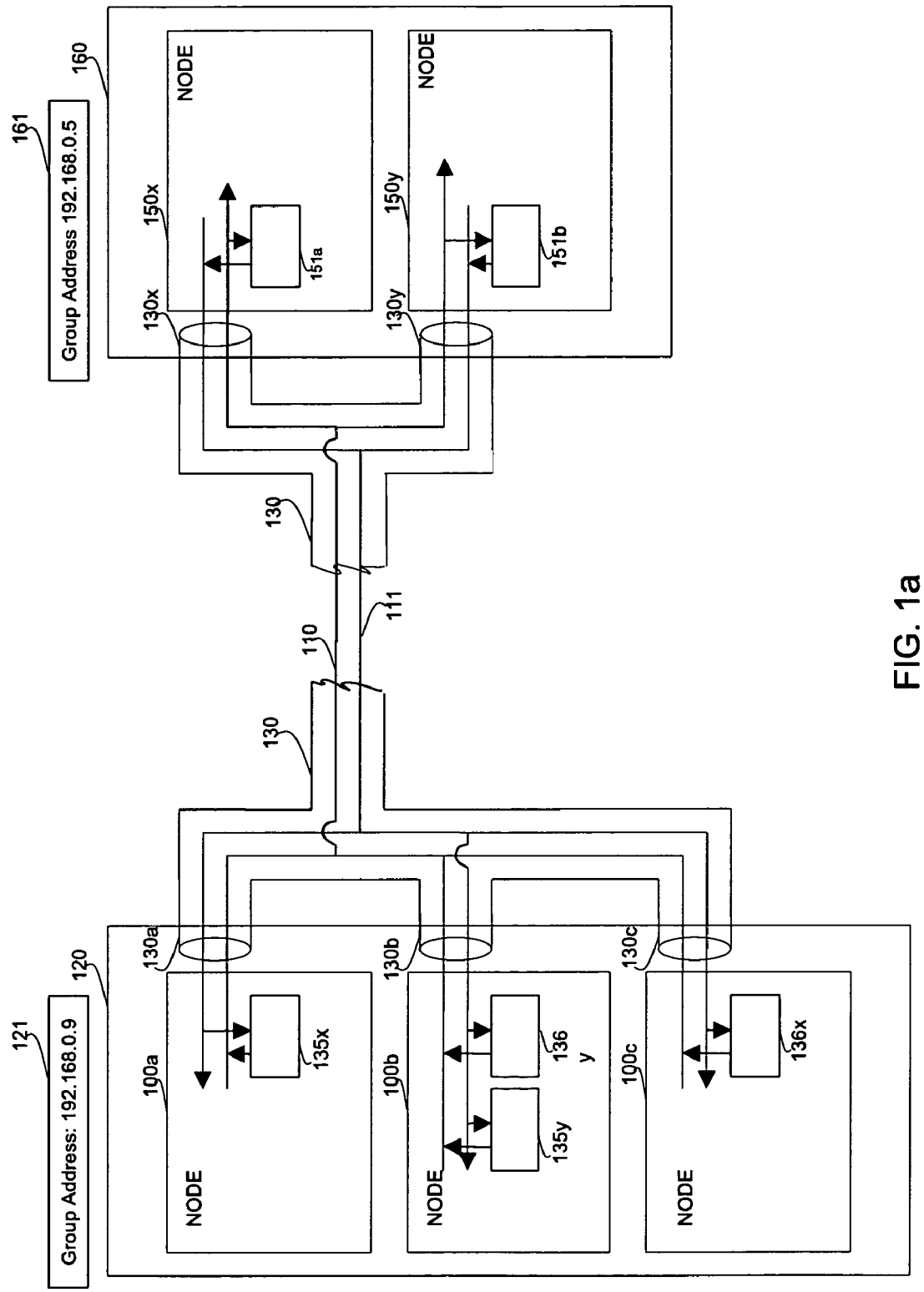
FIG. 1b is a block diagram illustrating a communication system in accordance with one embodiment of the present invention.
FIG. 1c illustrates a block diagram of organization of higher-level components for implementation of a communication system in accordance with one embodiment of the present invention.
FIG. 1d illustrates a block diagram of implementation of low-level organization components for optimized performance of a communication system in accordance with one embodiment of the present invention.

Referring now to FIG. 1a, illustrated is a communication system in accordance with one embodiment of the present invention. The communication system includes a TCP connection 130 that couples between a first group 120 and a second group 160. By way of example, the first group 120 has a first, second, and third member nodes 100a, 100b, 100c and the second group 160 has a first and second member nodes 150x and 150y. The member nodes in either group are organized symmetrically in that each node has equal access to a TCP connection and operates independently and in parallel. A first data stream 110 and a second data stream 111 can flow between the first group 120 and the second group 160 of the communication system.

A first application segment 135 and a second application segment 136 constitute a server application on 120. The first application segment 135 has a set of replicas 135x, 135y and the second application segment 136 also has a set of replicas 136x, 136y. The application segment replicas 135x and 135y runs over nodes 100a and 100b respectively while the replicas 136y and 136x runs over nodes 100b, 100c respectively. A client application at group 160 is comprised of an application segment 151 with replicas 151a and 151b.

Application segments 135 and 136 of the first group 120, communicate over the connection 130 with segment 151 of the second group 160. The two data streams 110 and 111 of the connection 130 follow TCP protocols. The connection 130 may have three different connection end points 130a, 130b, 130c at the first group 120 and two different connections end points 130x and 130y at the group 160 on the same connection.

Each group 120, 160 is assigned a respective group Internet Protocol ("IP") address 121, 161. Groups view each other as a single entity while being composed of nodes. Communications between two groups 120, 160 are addressed to each other through the group IP addresses 121, 161. When a request from say segment 151 arrives at the first group 120, it is viewed as data coming from group IP address 161. Similarly, the second group 160 sends data targeted to group address 121.

The endpoints 130a, 130b and 130c at the first group 120 may be set such that one or more of the application segment replicas 135x, 135y, 136x, 136y are delivered with an incoming request. Examples of the different policies by which data delivered to application segments are, all replicas, one replica, all application segments and select application segments, target determined based on request content, based on round-robin request distribution, based on a hashing scheme to map request to a specific node and weighted priority etc. In one such scheme modification ("write") requests are delivered to all replicas of an application segment while "read" requests are delivered to only one select replica.

Either of the endpoints 130x or 130y at the second group 160 may send request to server group 120. One or more of the receiveHeads at the endpoints 130a, 130b, 130c at the first group 120 receives the data depending on the settings. The endpoints 130a, 130b, 130c at the first group 120 may send response data which is received at the endpoints 130x, 130y at the second group 160. Application processes wanting to receive certain or all in coming data are guaranteed to have received it before acknowledging client with the receipt of data. In order to maintain TCP's sequential order of data transmission, the TCP sequence numbers are assigned in sequential order before data transmission starts.

Optionally, duplicate data output by replicas 151a and 151b in the second group 160 are reduced to a single instance to be transmitted to the first group 120 by the communication system. Similarly, output of replicas of application segments 135, 136 in the first group 120 may also be reduced to one. It is not necessary that replicas of 135a, 135b, 136a, 136b must produce outputs since in many cases request is delivered to only one replica depending on the settings.

The communication system in accordance with the present invention provides client/server requests and responses that are beneficially atomic. That is, they are sent or received as a contiguous sequence of bytes, enabling multiple processes over two groups send and receive data over a single connection.

The protocol between groups 120 and 160 is TCP and data is guaranteed to be delivered in the sequential order it was sent as per conventional TCP. When targeted to multiple end points, it is guaranteed that data is delivered to all target end points before client is sent with TCP ACK segment indicating the receipt of data. Optionally, when replica outputs must be reduced to transmission of a single copy output, it is guaranteed that output is atomic in that data is transmitted if all nodes output same data. However when results don't match applications may optionally choose output to transmit based majority agreement or correct or successful result, etc.

With application segmentation, application processes are typically delivered with only select portions of an incoming data stream for processing. For example, requests arriving on the second data stream 111 may be delivered to select applications segments. The order of the delivery of data to application processes must be guaranteed to be the order in which it was sent as specified by RFC 793, i.e., before certain data is delivered to an application segment all preceding data arrived in the stream must be successfully delivered to its target end-points.

Figure 1B:
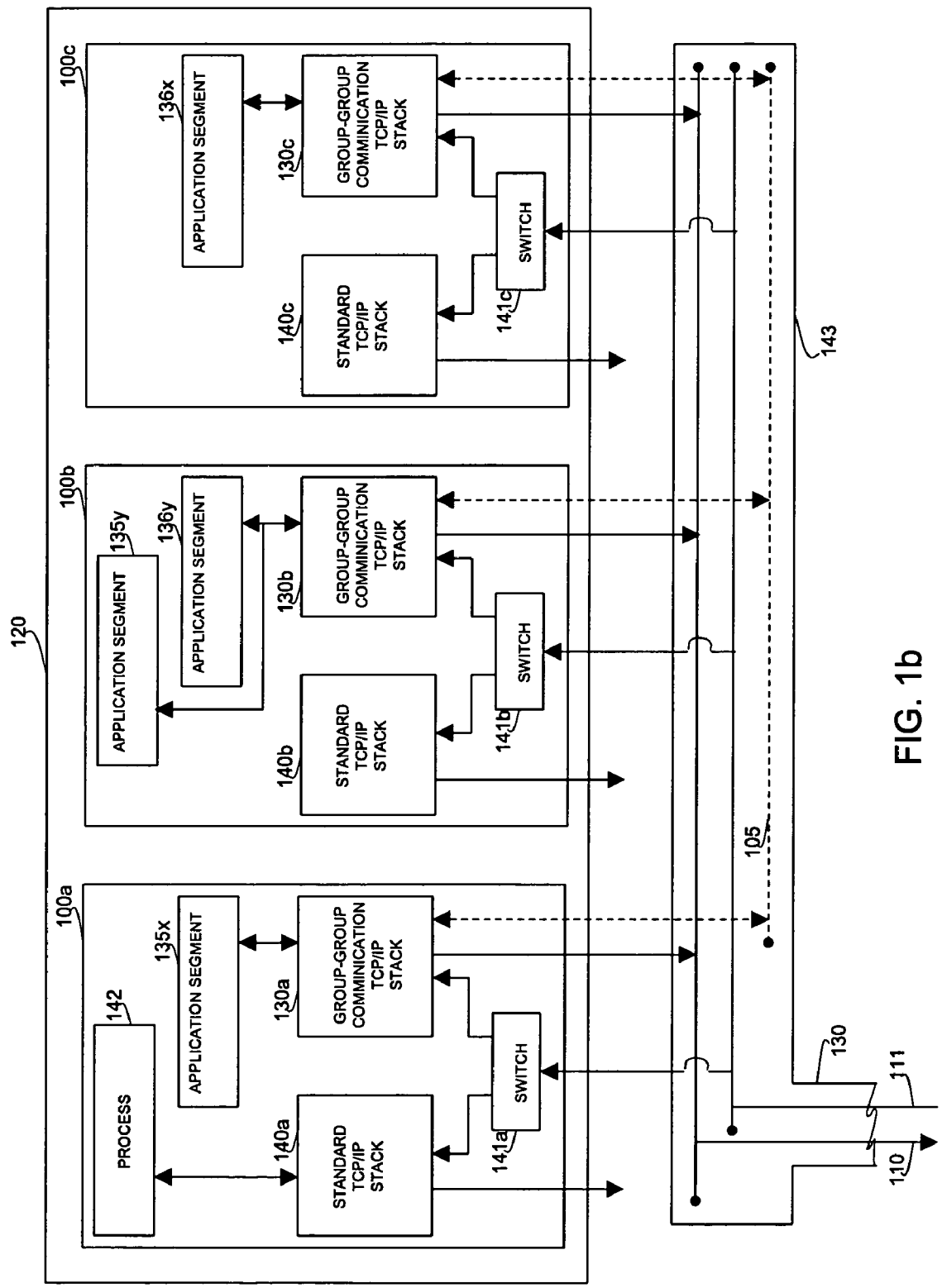

Referring to FIG. 1b, the first group 120 is comprised of the first, second, and third nodes 100a, 100b, 100c. The connection 130 between the first group 120 and the second group 160 has the outgoing and the incoming data streams 110, 111. Each node 100a-c has a group-to-group communication stack 130a-c respectively. The delivery of data to all of the nodes is through a switch 141a-c coupled with the respective nodes 100a-c. No assumption about the delivery guarantees to switch 141a-c by the underlying hardware is made, since popular hardware technologies such as Ethernet are unreliable. Delivery of data to each node 100a-c or any of its subsets may be selective or no delivery at all is possible by the underlying hardware devices.

The incoming data is switched by the switch 141a-c to either regular TCP/IP stack 140a-c or to the group-to-group communication stack 130a-c, based on the IP address and/or port. An application process 142 of node 100 communicates using the standard TCP stack 140. The application segments 135x,y, 136x,y communicate with group communication stack 130a-c respectively. The 105 carry control signals that coordinate and controls operations of group 131. The scope of the signals sent over control bus 105 is limited to the first group 120. The virtual bus 143 is comprised of the first and the second data streams 110, 111 and control signals 105 spanning group 120. This bus is directly tapped into by the peer group TCP connection 130.

An alternative to the virtual bus 143 is the point to point communication between nodes and has the advantage of better bandwidth usage. However, this necessitates each node in a communication system to keep track of other nodes and their addresses and their roles. In one embodiment, a logical bus model is preferred over control messaging due to location and identity transparency.

Figure 1C:
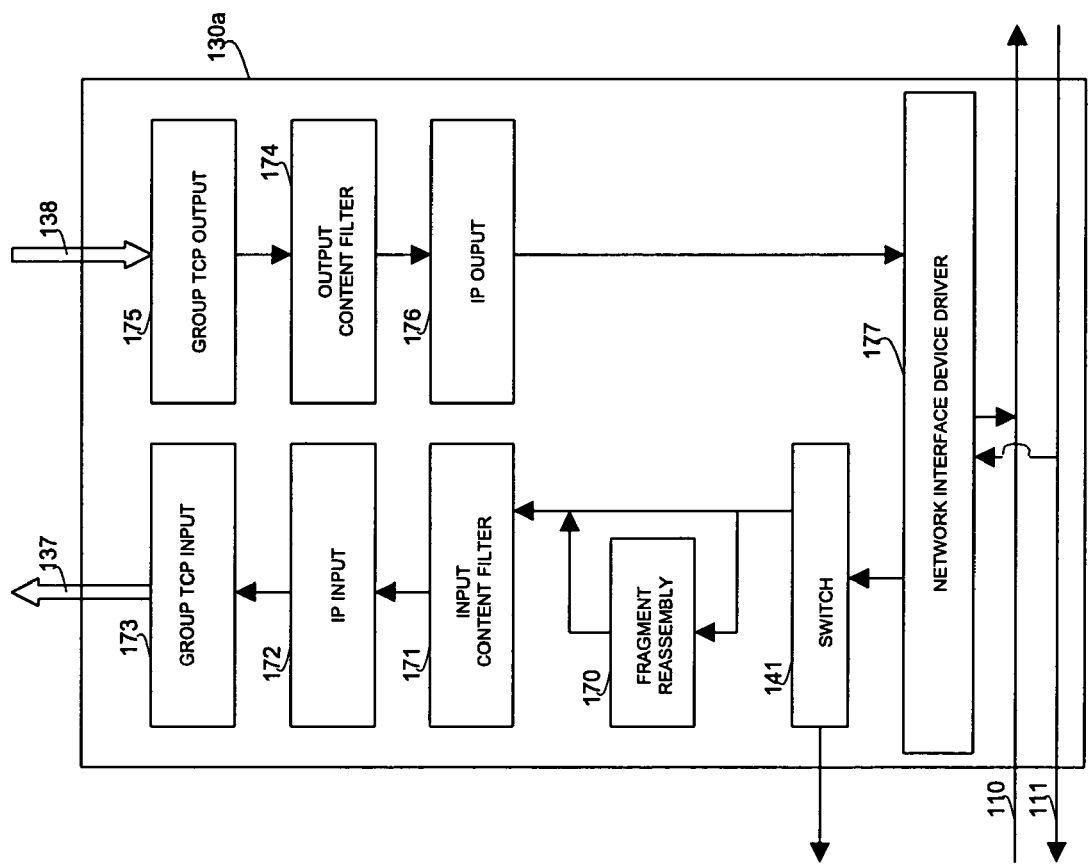

Referring to FIG. 1c illustrated is the connection end point 130a in accordance with one embodiment of the present invention. Generally, the switch 141 directs data to either standard TCP stack or the group-group communication stacks Internet Protocol ("IP") input 171. For fragmented IP packets, 170 performs reassembly before passed to 171. When input packet is not fragmented, it may be passed directly to the input content filter 171 after few basic consistency checks. The input content filter 171 examines the input data content and or packet header to determine if it contains data to be passed in to the application segment (e.g., 135x, 135y, or 136x).

If the communication system determines not to pass a packet further up, it is discarded with no further action and any memory is freed. Otherwise the input content filter 171 marks segments of the packet that is being passed into application. The packet is then passed to IP input processing layer 172 for complete validation including checksum computation and other consistency checks. Any invalid packets are discarded with no further processing. Resulting packets are then passed into a group-group TCP layer 173. The group-group TCP layer 173 coordinates with group nodes (e.g., 120, 160) and controls data receipt to meet TCP specification requirements such as acknowledgements to peer group. The group-group TCP layer 173 maintains the input TCP states of connection and passes data to socket through data path 137. Data path 138 indicates transmit data path from socket interfaces into the stack.

The user socket sends out data invoking an output content filter 174. In one embodiment, the output content filter 174 is not installed, and hence, performs no operation. A filter for fault tolerance, synchronously compare data to be sent with other replica segment outputs and transmits a single output instance. The selection of output instance transmitted to peer group depends on the policy set in the filter such as equal outputs, majority agreement, correct result or successful operation output and the like. Upon failure of a transmitting segment instance, a replica takes over and continues transmissions without connection disruption. At successful output instance reception at peer group, the replicas discard the data and frees up memory. The output content filter 174 passes data for transmission, to a group TCP output layer 175. The group TCP output layer 175 controls data transmission and maintain transmission states in conjunction with group nodes. The group TCP output layer 175 works with its group nodes to transmit data to peer group in the sequential order as specified by TCP. The group TCP output layer 175 passes an IP output layer 176 with data to transmit. The IP output layer 176 later performs standard IP functions on the data and passes it down to device driver 177 for data transmission.

When an output comparison result by the output content filter 174 indicates differing outputs produced by nodes, a subset replicas are considered faulty and excluded from further service over connection while remaining endpoints continue service without connection disruption. In an embodiment having the exclusion of an endpoint, such exclusion is based on schemes where majority of endpoints agree on a result to exclude others. Alternatively, exclusion of endpoints may occur where an operation failed. Exclusion of an endpoint may also be from any application specific scheme that is programmable with filter. Upon failure of an endpoint during transmission of data, a replica endpoint if any completes the transmission without disruption of the connection.

Figure 1D:
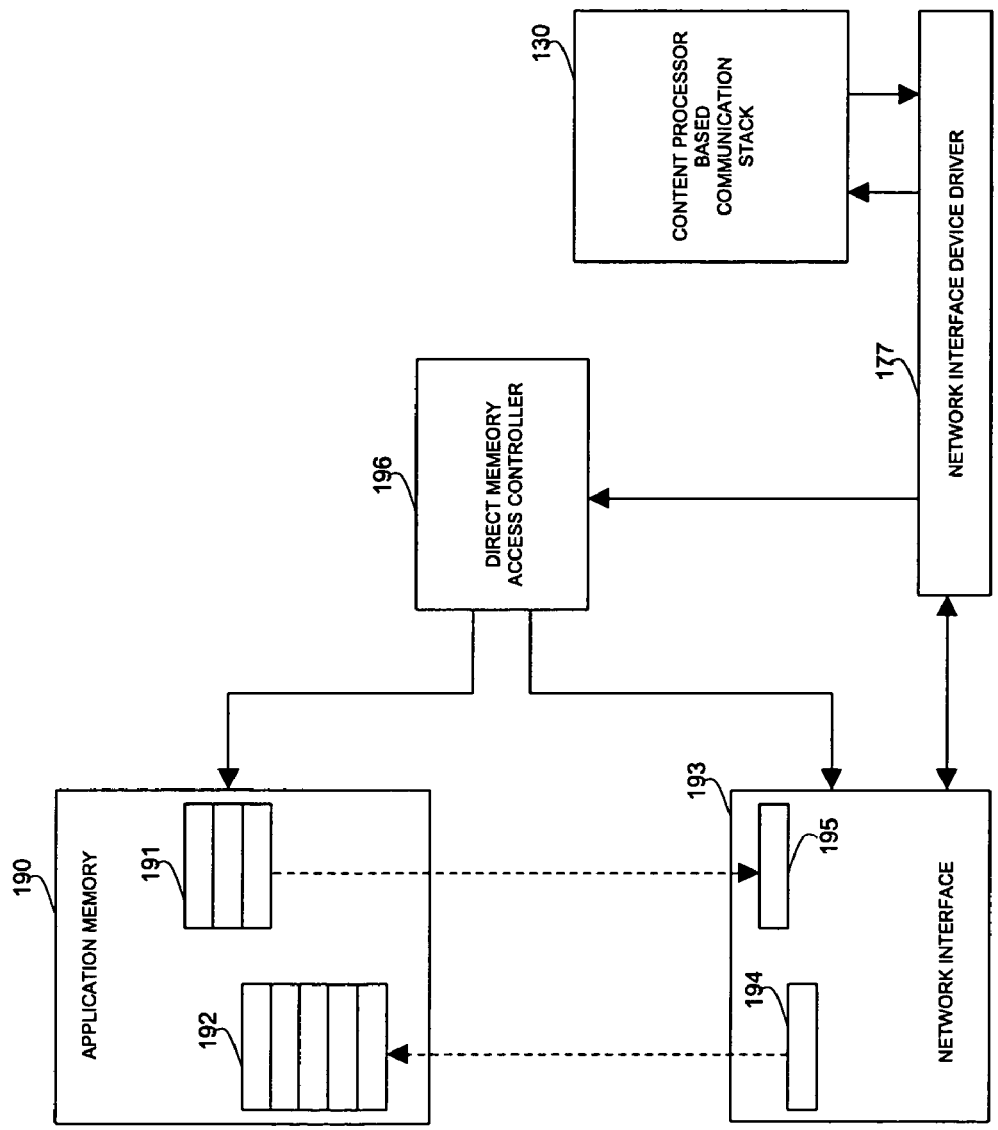

Referring to FIG. 1d, illustrated is the connection end point 130 in a group-group communication stack, where the content processor examine input and output data, in accordance with one embodiment of the present invention. Content filtration is a function of content processor. Content processors determine where in the application memory the data must be placed, order of data and time to notify application such as a full request is received. Working in conjunction with the network interface device driver 177, data is copied between a network interface 193 and an application memory 190 by a direct memory access controller 196.

Examining incoming new request data, the content processor allocates the memory 192 in the application space. The allocation size is application specific, typically size of the complete request data from peer. Remaining data of request do not require allocation if memory for the complete request was allocated. Output data 193 is allocated by application itself. Further, there may be copies of segment of request/response data 194, 195. With this scheme application data is directly copied between network interface input/output buffer and application memory with no intervening memory copies involved.

Figure 2:
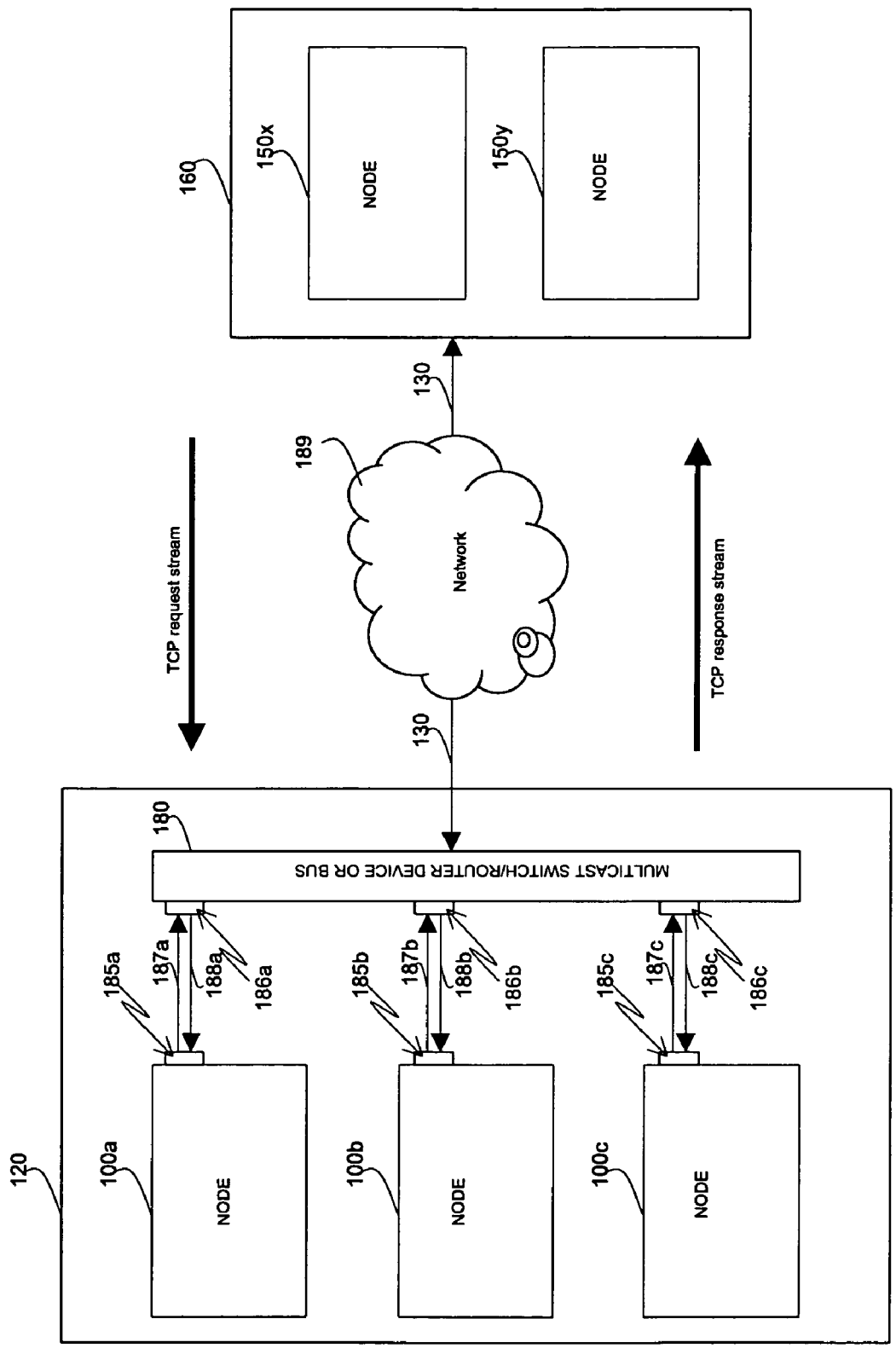
FIG. 2 illustrates a block diagram of hardware organization of higher-level components for implementation of a communication system in accordance with one embodiment of the present invention.

Referring to FIG. 2, the first group 120 may be a set of servers comprised of the nodes 100 (100a,b,c). The second group 160 may comprise a set of client nodes 150 (150x, y). The nodes 100, 150 in each group 120, 160 are connected to each other via a connection device 180. The connection device 180 may comprise a broadcast/multicast device, for example, an Ethernet bus or a layer ⅔ switch. A network 189 may be any conventional network, for example, a local area network ("LAN") or the Internet, through which two node groups are connected. The network 189 is not necessary when both peer groups are directly connected via the connection device 180.

In one embodiment, the communication system illustrated in FIG. 2 includes one or more network interface ports 185a, b,c at the server nodes 100a,b,c. Communication links 187a, b,c and 188a,b,c connect device 180 with nodes 100. The input data arriving through the connection end point 130 is replicated to 188a,b,c by the connection device 180 using its layer 2 or layer 3 multicast or broadcast capabilities. The arriving data is delivered to ports 185a, 185b, 185c. There are no guarantees of data delivery by 180, or the hardware ports or links involved. The data transmitted by the first group 120 through 187a, 187b, 187c are independent to each other, and hence, operate in parallel. The data transmitted through 187a, 187b, 187c to peer group are not necessarily visible to 120. As with incoming data over connection 130 signals sent over the logical bus 105 is replicated to links 188*a*, 188*b*, 188*c* by the device 180. Data sent to logical bus 105 of FIG. 1*b*, is visible to server nodes 100*a*, 100*b*, 100*c*.

Signals

In one embodiment of the present invention signals may have connection identification information common to a group. Further, signals may also and have source and target identifications. Target identification may be one or more nodes or may be an entire group.

In one embodiment of the present invention, signals within the communication system may include an IACK signal, which is an input acknowledgement signal acknowledge input data from peer on behalf of the group. The IACK may include acknowledged sequence number, remaining bytes of data expected from peer group, window update sequence number, latest and greatest time stamp and a PUSH flag indicating if receiving active sendHead must send a peer group TCP ACK. A REQSH signal comprises a request and may ask for latest sendHead assignment targeted to an active sendHead. The target addresses may be an entire group.

A GRANTSH signal comprises a message having active sendHead state information, bus time, list of nodes whose REQSH being acknowledged, and most recent IACK information known. A target of this signal assumes active sendHead after updating the state information. An IACKSEG signal comprises an input data acknowledgment, sent on behalf of a segment. It may have the information the same as or similar to the IACK signal. A REQJOIN signal is sent to application segments requesting to join the service over a connection. A LEAVE signal is sent requesting permission to leave service of an application segment on the connection.

An ACKLEAVE signal grants permission to an application to leave servicing on a connection. A RESET signal is sent to request to reset a connection. A CLOSE signal is sent to request to close the output stream of connection by an application segment. An ACKCLOSE signal acknowledges receipt of CLOSE request.

Connection Establishment and Termination

Conventional TCP state diagrams are known. A flow chart describing such state diagrams is shown and described in a book by Richard Stevens entitled "TCP/IP Illustrated Volume I and Volume II," the contents of which are hereby incorporated by reference. In addition, TCP/IP protocol and options are also discussed in RFC 793, and RFC 1323, the relevant portions of which are hereby incorporated by reference.

During connection establishment and termination, a node is elected to act as the bus controller which co-ordinate and control the process and communicate with the peer group on behalf of the group. By default a static bus controller is chosen, however application program optionally selects bus controller as needed. In order to distribute the load due to the controlling of the bus over to group member nodes, bus controller function may be assigned to nodes in round robin fashion, alternatively bus controller may be chosen dynamically based on hashed value of in coming sequence number or source IP address/port address combination. A scheme where segment with lowest ID assume the bus controller role, when replicas of segments are available the bus controller responsibility is assigned on round-robin fashion among replicas.

Generally, there are four types of connection operation in TCP. Each type follows different set of state transitions. When the group initiates a connection to peer group, it is referred to as active initiation, while a connation process in initiated by the peer group it is referred to as passive initiation. Similarly when connection termination is initiated by the group, it is referred as active termination and when termination is initiated by the peer group it is referred to as passive termination.

Passive Connection Establishment

With passive initiation, upon arrival of a synchronization ("SYN") request from a peer group, the bus controller sends out REQJOIN signal requesting application segments to join the connection service. The bus controller then responds to peer group with an SYN request with an ACK (acknowledgement) for the SYN it received. When peer group acknowledges the SYN request sent on behalf of the group, the group nodes running application segments respond with a IACKSEG. When all required group nodes joined connection service with IACKSEG signal, connection is considered established and data transfer may be started.

Active Connection Establishment

In active initiation, for a connection initiated from a group, the bus controller sends out REQJOIN signal targeted to group nodes. It then initiates connection process with peer out by sending SYN request on behalf of the group. Group nodes, upon receipt of a SYN request from peer group with an ACK for bus controller SYN, send IACKSEG indicating receipt of a valid ACK from peer group. Upon receipt of IACKSEG from required nodes, bus controller sends out ACK for the SYN request from peer group and the connection is considered established.

Passive Connection Termination

With passive termination, upon receipt of FIN segment from the peer group, the nodes send a IACKSEG signal indicating the receipt of FIN. When IACKSEG from all required segments are received, the bus controller responds to peer group with an ACK for the FIN (finished) received. When the nodes finished sending data, they send LEAVE signal indicating wish to leave connection. When LEAVE request signals from all group nodes have been received after the FIN receipt, bus controller sends out FIN request to peer group. The bus controller sends out an ACKLEAVE signal and upon its receipt the target of the signal node enters the CLOSED state. Upon arrival of an ACK for the FIN request sent out, the bus controller enters CLOSED state.

Active Connection Termination

In active termination, when application segments are finished sending data and wish to close connection, they send CLOSE signal. Upon receipt of CLOSE request from all group nodes, the bus controller sends out FIN request to peer group. Upon receipt of FIN request from peer group, the nodes send out LEAVE request. When LEAVE signal from group nodes and ACK for the FIN sent, is received, bus controller enters TIME_WAIT state.

Data Input Over a Connection

Figure 3A:
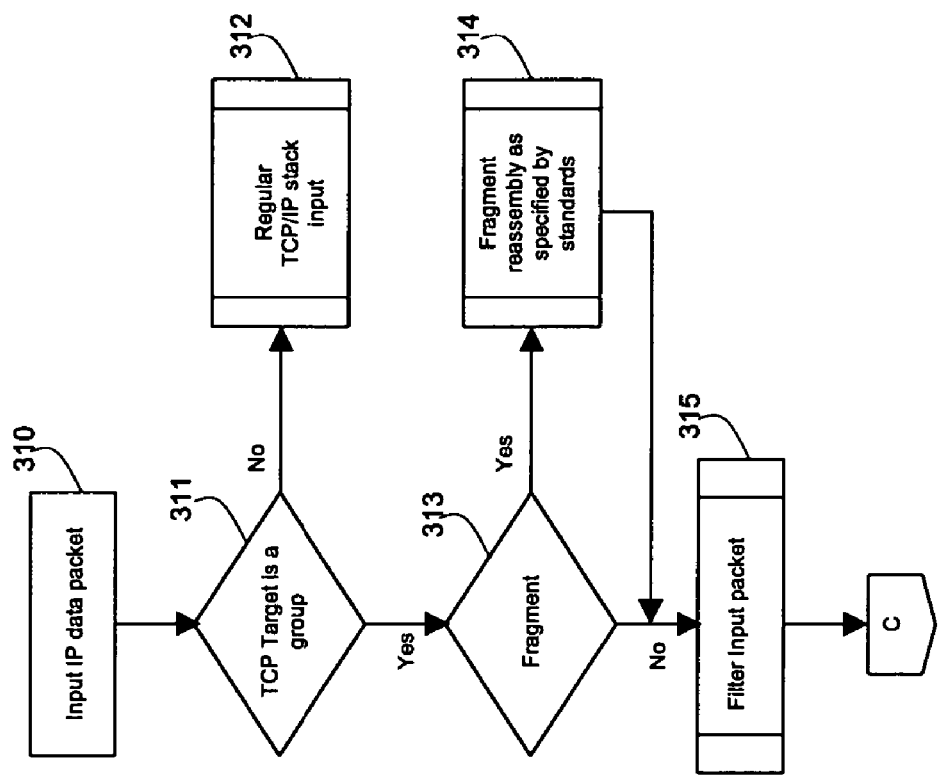
FIG. 3a illustrates a flow chart for input data processing path on a connection in accordance with one embodiment of the present invention.

Referring to FIG. 3*a*, when a data packet arrives on a node, it is checked (311) if the packet is targeted to a group address. If so and packet is a TCP fragment, fragment reassembly operation (314) is performed which yields a complete TCP segment upon the arrival of last fragment of the TCP segment. In most cases TCP segments are not fragmented so the no such operation is invoked.

When the TCP segment is not targeted to a group, then standard TCP/IP stack is handed over (312) with the TCP segment for further processing.

Figure 3B:
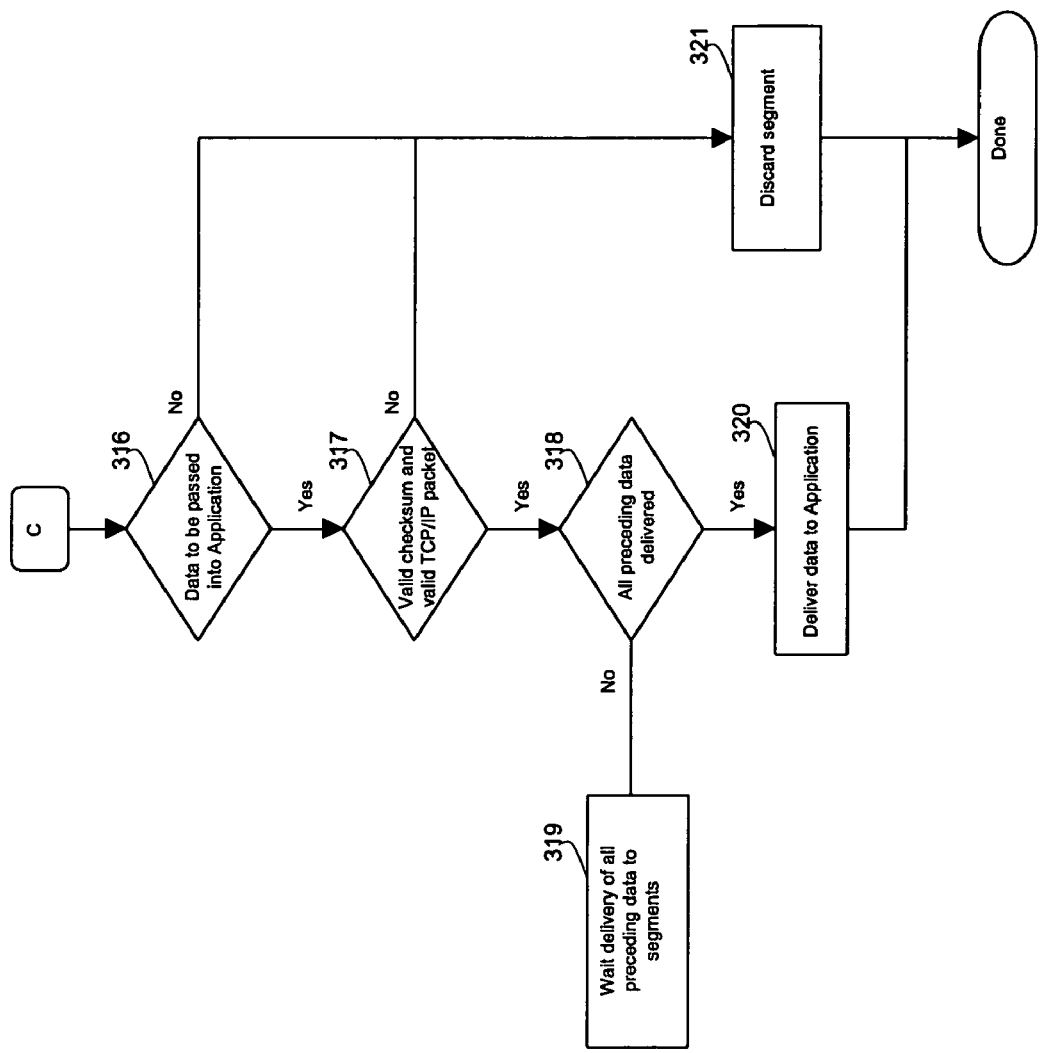
FIG. 3b illustrates remainder of FIG. 3a, a flow chart for input data processing path on a connection in accordance with one embodiment of the present invention.

Referring to FIG. 3*b*, the group's receiveHead upon data receipt invokes filter (315) and verify (316) if there is data targeted to application segment on the node and discards data uninteresting to applications. Resulting data packet after filtration is checked for timestamp validity, checksum validity and validity of other TCP/IP parameters (317). All invalid packets are discarded right away. The receiveHead updates the state to reflect all valid packets it examined. By performing checksum and other detailed packet verifications after filtration avoids computational overhead of discarded packets.

It is then verified (318) if all data preceding the received data is guaranteed delivered (320) to appropriate applications segments, any data immediately following it is passed into application segment. TCP ACK segments are sent to peer group if necessary as per the specifications. If however there is preceding data pending acknowledgement the data is queued (319) awaiting acknowledgement.

If a segment instances fail during reception of data, any remaining instances continue the reception and the acknowledgment control. This enable applications continue service without disruption upon node failures.

Data Filtration

Figure 3C:
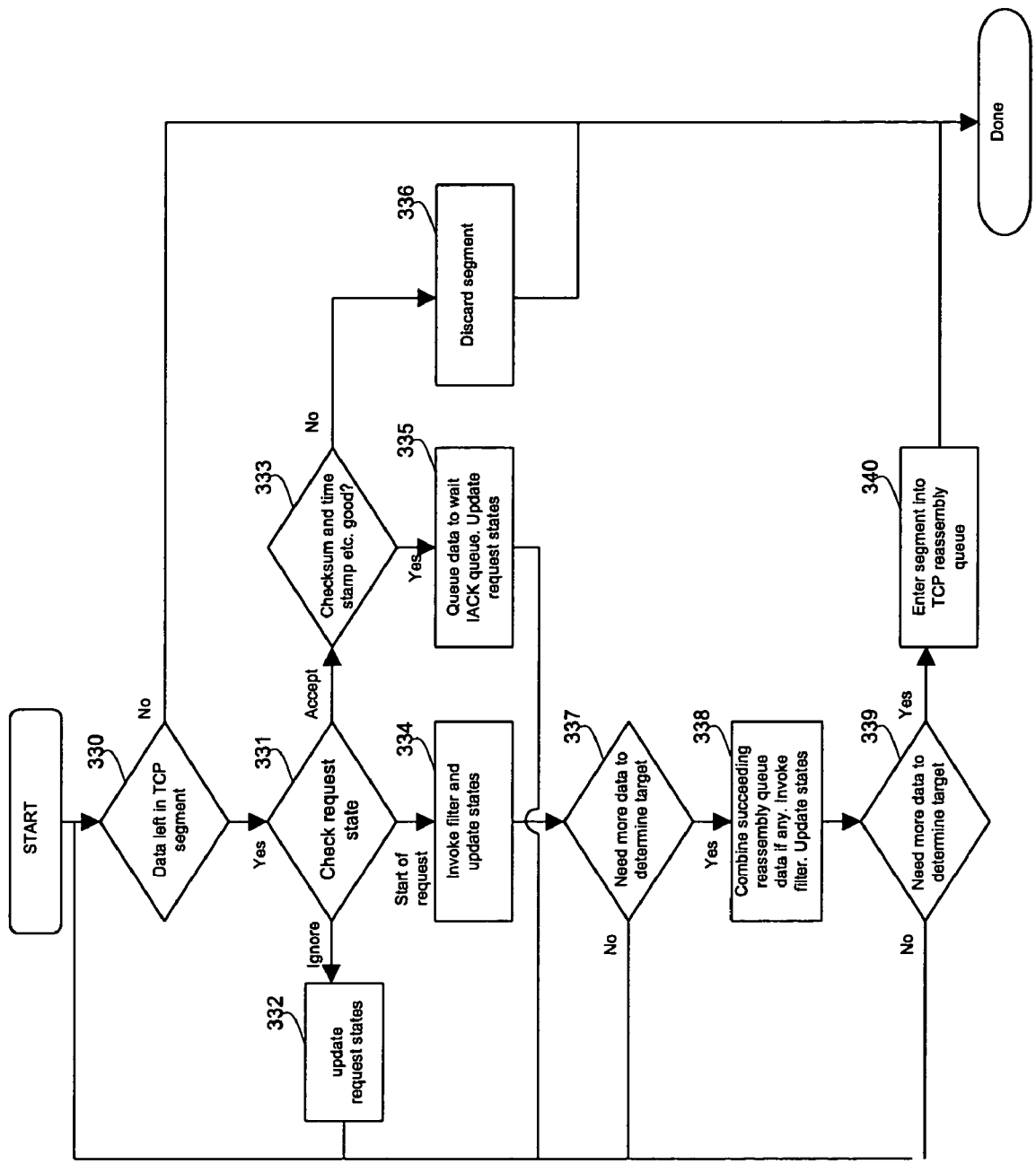
FIG. 3c illustrates a flow chart for filtering incoming data on a connection in accordance with one embodiment of the present invention.

Referring to FIG. 3c, the receiveHead maintains state of input data such as if request is being ignored, passed in to application, start of a new request, need more data following to determine the target etc. As a packet may contain more than one request or partial request data, it is verified (330) if packet has remaining data to be processed. If there is no data left the filtration process is complete.

When there is data remaining in packet to be filtered the current state is verified (331). If the current state indicates that request data must be discarded, up to a maximum of the request data in the packet is scheduled (332) as discarded and verified more any remaining data (330). Similarly if request data is being accepted and must be delivered to application segment, then remaining portion of the request data of the packet is scheduled for delivery. All delivered data must be check-sum computed, timestamp and packet header verified (333) only once and invalid packets are discarded (336) right away.

When the current state indicates start of a new request the application specific filter is invoked (334) to determine data target and the current state updated to reflect the result of verification. If the filtration code could not determine the request target due to lack of sufficient data, it is combined with any immediately following data from reassembly queue which holds data arrived out of order. If there is still not sufficient data the remaining data is entered into reassembly queue so that the check is repeated when sufficient data arrives. Instated if sufficient data was found step 330 is repeated to filter data.

Data Input Acknowledgement

When atomic data delivery to multiple endpoints are required, acknowledgement for received data is sent out only when all endpoints have positively received the data. The target endpoints upon receipt of data sends out IACK signal over the bus indicating the data receipt in the TCP order. The active sendHead, after verifying if all required nodes have received specific data, sends out TCP ACK segment to peer group if due per TCP specification.

Data Output Over a Connection

Multiple end points of a group may transmit data in TCP order. It is thus necessary to assign consecutive sequence numbers to segments of data to be transmitted. It is also necessary to maintain of the consistency of data transmitted, in order to avoid mixing up distinct request/responses from endpoints. For this purpose each complete request/response data is treated as a record by the transmitting node.

Figure 4:
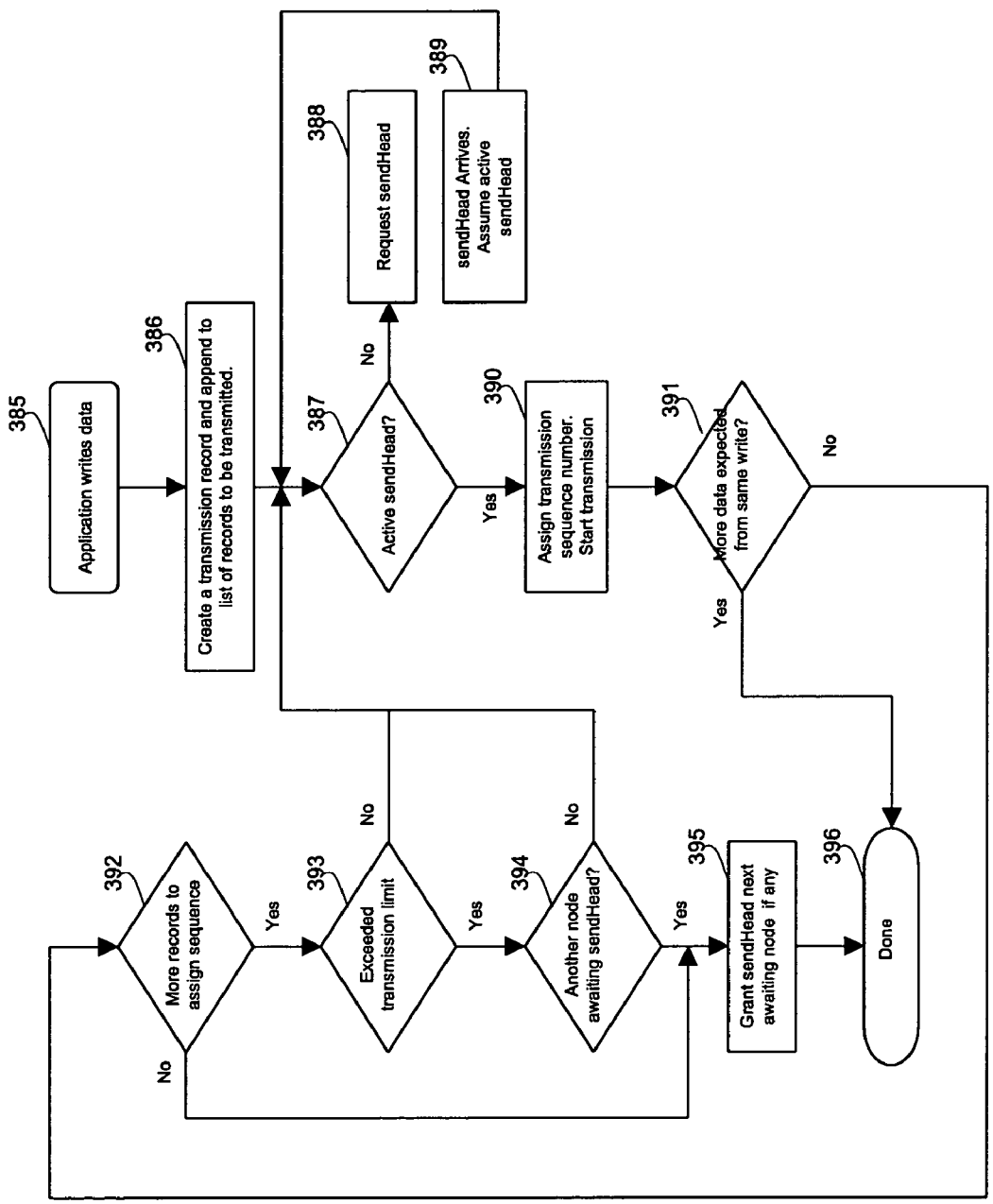
FIG. 4 illustrates a flow chart for transmitting data over a connection while limiting maximum transmission size at a time for fairness among nodes in accordance with one embodiment of the present invention.

Referring to FIG. 4, when application process writes data (385), a new transmission record is created (386). If more than one write request data must be sent with no other intervening data sent to peer, MORETOCOME flag is set until last write is reached. If the transmitting node is not an active sendHead (387) already, a request for active sendHead is send out (388) with REQSH signal unless an earlier request was acknowledged or pending. Upon arrival of the active sendHead state with GRANTSH signal targeted to the node (389), active sendHead is assumed after updating with latest information from the GRANTSH and check if active sendHead (387) is repeated.

After becoming active sendHead the node that has data to send, assigns fresh transmission sequence number to the record in sequential order and the transmission is initiated (390). If no more data is expected in continuation of the write operation being transmitted (391) and no more records wait to be assigned with transmission sequence number (392) or maximum transmission limit is exceeded (393), active sendHead is granted to the next requesting node if any (394) are waiting.

The node to grant sendHead next is determined by selecting node with node-id that is numerically closest in a clockwise manner from the list of REQSH requesters, highest priority sendHead requester, round-robin or any application specific schemes. If however, more transmission records are awaiting assignment of sequence numbers step 387 is repeated with to send out remaining data.

Active SendHead Assignments

Figure 5A:
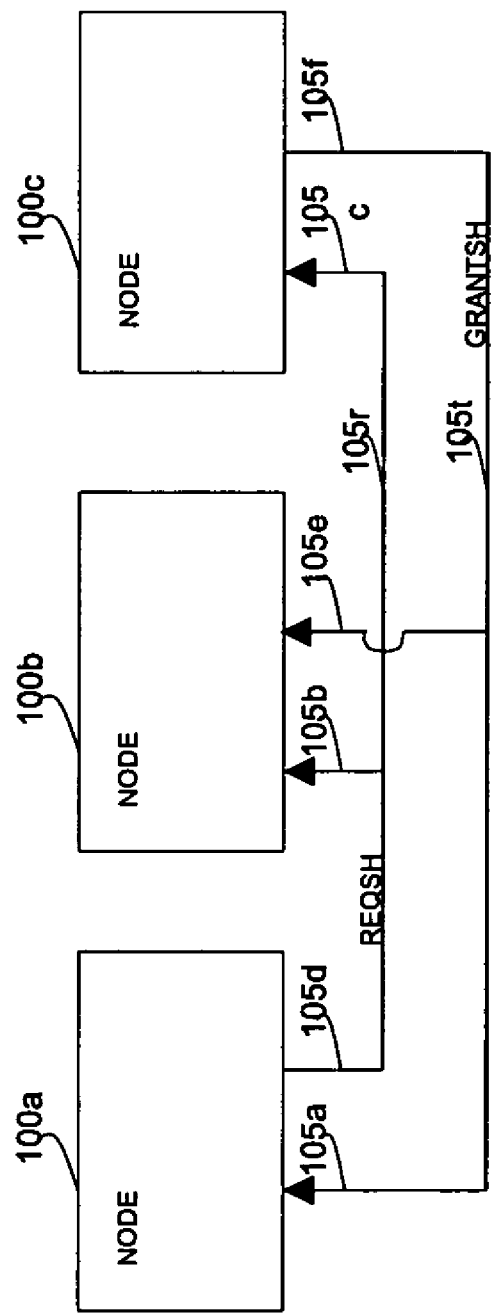
FIG. 5a illustrates a block diagram of a request/grant scheme for active sendHead asignments in accordance with one embodiment of the present invention.

Referring to FIG. 5a, a scheme for active sendHead assignment is described here. A node (100a) sends out REQSH (105r) signal requesting active sendHead role and active sendHead (100c) grants the role with GRANTSH (105t) signal with necessary state information to the requestor. The REQSH signal is sent out by Node 100a. Node 100b ignores the REQSH not being active an sendHead. Node 100c which is the active sendHead at the time of request, responds to 100a request with GRANTSH signal as sendHead is free to be granted.

Upon receipt of GRANTSH signal, requesting node 100a assumes active sendHead. The GRANTSH signal contains a list of pending requestors as maintained by the group. Node 100b, upon examining GRANTSH signal 105t, checks if its own request for active sendHead if any was acknowledged, by verifying list of pending requesters in the signal. When acknowledged, the retransmissions of REQSH signal is turned off.

When a node grants active sendHead to another, if it has outstanding data to be transmitted, it adds itself to the list of requestors to avoid additional request signals. An alternative to sending signals such as REQSH to all nodes is to send them directly to targets such as active sendHead node. The advantage of this approach is better bandwidth usage however, it lack location transparency.

Figure 5B:
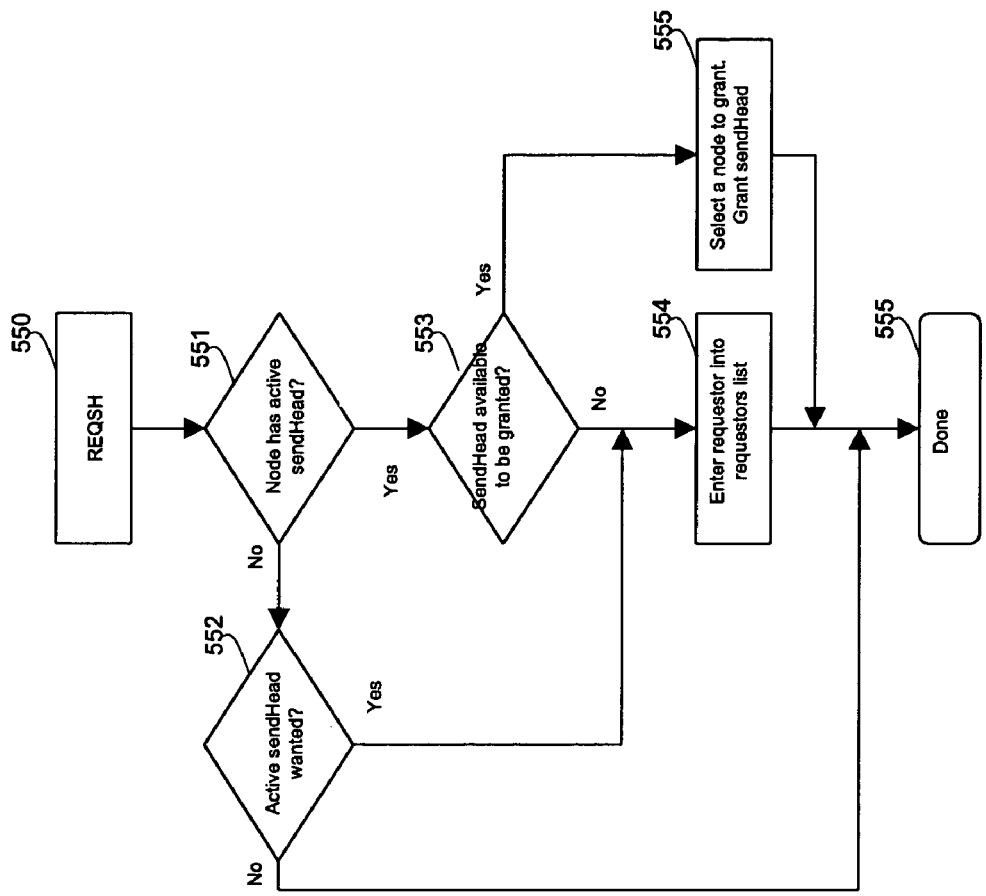
FIG. 5b illustrates a flow chart for processing a request for sendHead in accordance with one embodiment of the present invention.

Referring to FIG. 5b, when REQSH signal arrive on active sendHead node (551), and if sendHead is not available to be granted (553), the requester id is entered into a list of requestors (554). However, a GRANTSH signal is sent out (555) targeted to a requestor when sendHead is available for grant. The GRANTSH acts as an acknowledgement signal for all outstanding REQSH with the list of outstanding requestors are in it. To acknowledge receipt of REQSH without granting another, the sendHead grants itself. When GRANTSH arrive on target node, the list of requesters are added to the local list of requestors. The GRANT signals are sequenced by assigning unique monotonically increasing sequence identification number for each instance of sendHead grant except retransmissions.

TCP Time Stamp and Round-Trip-Time (RTT) Calculations in a Group

Most TCP implementations comply to The RFC 1323. It specifies a method to measure round trip time using time stamps. The round-trip time is typically measured subtracting the time-stamp of data server acknowledged from host's real time. To identify invalid packets due to wrapped around sequence numbers, the specification requires time stamps be monotonically increasing.

Meeting the specifications with a number of nodes of varying types with different hardware timers is challenging. An ideal solution is nodes have a perfectly synchronized times, however is difficult at best. In one embodiment a specification requirement of monotonically increasing time stamp is met by synchronizing time on a node sending data with time of node sent data last. This synchronization guarantees data is always sent with an equal or higher time stamp value than previous TCP data segment timestamp.

An implementation of the scheme is given here. Nodes maintain real time namely 'localtime' usually implemented with hardware clock incrementing its value at fixed intervals. A group wide real time clock namely "bustime" must be implemented for each TCP connection by the nodes. The "bustime" on any node is calculated as bustime=localtime−basetime The basetime can be an arbitrary value chosen by bus controller initially and calculated thereon. Any time a node is granted with an active sendHead, the bustime of the grantor is sent along with the GRANTSH signal. The node granted with active sendHead, at the receipt of GRANSH signal, adjusts its bustime as set forth below.

If bustime less than grantor bustime received with active sendHead then bustime=grantor bustime (i.e. bustime from GRANTSH signal)

Though bustime on nodes may not be perfectly synchronized with above formula due to GRANTSH transmission delay, it meets the requirement of monotonically increasing timestamp value. By choosing the granularity of bustime higher than the granularity of timestamp sent, error due to conflicting timestamps during concurrent retransmissions by nodes is reduced. As an example when timestamps have a granularity of 10 milliseconds and bustime having granularity of one microsecond, the error factor is reduced to one in ten thousand from one. For precise round trip calculations, the basetime at transmission is entered into transmission record by the sendHead. To account for minimum latency of the signal a fixed time value is added to the grantor bustime at the GRANTSH target node. Using bustime as timestamp, the round trip-time of a packet is calculated as round-trip-time=bustime−timestamp TCP Window Update in a Group Window is the amount of data an end-point is able to accept data in to memory. In conventional TCP with just two end-points to have this information agreed between for optimal performance is easily. With multiple endpoints involved, each having different memory sizes and unpredictable data targets achieving optimal usage and performance is critical.

Described here is a scheme where a group wide single virtual window size is used for effective window management in a group. The sendHead is responsible for updating peer group with window information on behalf of the group. Group nodes are initially assigned with the virtual window size. Nodes update window to active sendHead by sending input sequence number of data read-in by application once delivered. The active sendHead, updates the peer group with the window, obtained by subtracting the amount outstanding data to be passed into application from the group wide virtual window size.

Window updates are piggy-backed with IACK signal to reduce the number of window update signals. To further reduce the number of window update signals and TCP segments, a reserved window size is maintained in addition to the virtual window. At any time data amounting to the sum of these windows can be outstanding to be acknowledged by the group. When a node sends out IACK acknowledging receipt of data sized less than or equal to reserved window and all preceding data was read-in by the application, an updated window equal to IACK sequence is used, as if so much data was read-in by the application. Since window update is made along with IACK, this avoids additional window update signal is required otherwise. This technique is optionally set or reset.

Figure 6:
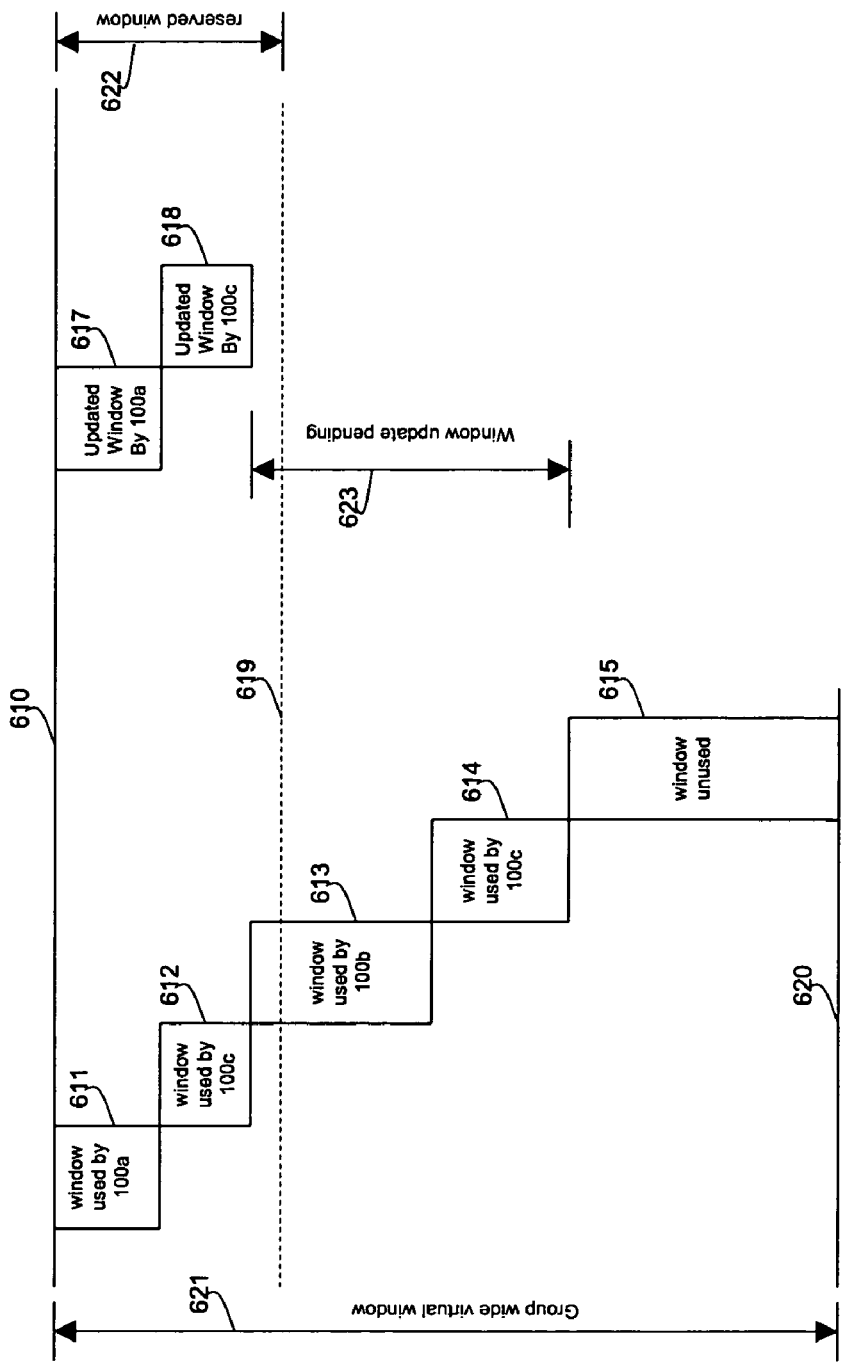
FIG. 6 illustrates a block diagram describing a virtual window scheme for peer group window advertisements in accordance with one embodiment of the present invention.

Referring to FIG. 6, the unacknowledged input sequence is indicated by 610, and 620 indicate the maximum data sequence number expected as advertised to peer group. 619 represent maximum reserved window sequence up to which a window update may be sent. 611, 612, 613, 614 shows the window sequences of data received by nodes 100a, 100c, 100b, 100c respectively. 615 is the amount data that may be sent by the peer group. 617 and 618 shows the window updates sent by nodes 100a and 100c along with the IACK they sent with respect to 611, and 612. The maximum advertised window is shown by 621 and maximum reserved window is show by 622.

Protection Against Wrapped-Around Sequences with Group TCP

In a high speed network such as 10 Gigabit Ethernet, the TCP's current 32-bit sequence number wraps around in a short period of time. A delayed signal such as IACK, with wrapped around sequence number may be considered valid mistakenly when sequence number is used to acknowledge data input. We use a scheme where 32-bit TCP sequence numbers are mapped to a 64-bit TCP value which takes into consideration the number of times a 32-bit sequence number warped around since the initiation of the connection. The 64-bit sequence values used within the group are mapped back to 32-bit where it is used with peer.

To map 32-bit sequence, we split the 64-bit sequence into two 32-bit values where the least significant 32-bits represent the TCP sequence actively used with peer. The high order 32-bits count the number of times the sequence wrapped around since the connection was initiated. To map 64-bit value to 32-bit sequence number the least significant 32-bits used. In an alternative embodiment IACK is sequenced although the overhead may be the same.

Application Segment Instances and Replication

Multiple instances of a segments enable further distribution of load among nodes. Load among the replica segments may be shared by delivering requests to segments using schemes such as round-robin, least-loaded, hashed, affinity based etc. in conjunction with filters.

Segment replicas enable fault-tolerance. If during input, should replicas fail, remaining replicas if any continue service without disruption. This is achieve by replicas maintaining a consistent view of the inputs. The segment controller enable the consistency among the replicas with atomic input delivery. A new segment controller may need be elected after failure.

If a replica fails during transmission of data, remaining replicas may continue the service without disruption of connection. Each replica agree on an instance of output and sendHead states are shared before transmission is started. Each replica frees up memory and data acknowledged by the peer group.

Each application segment is free to choose number of replicas it maintains. A node dynamically elected as segment controller coordinates the replica IACK to form a segment IACK. The election of segment controller can be based on round-robin, least loaded, hashed or even a static node. Connection establishment, termination, window management all works as stated here in conjunction with corresponding schemes described earlier. In all cases when segment replicas agree on receipt of certain input segment, controller responds on behalf of the replicas. When there load is balanced among segment instances as opposed to replicas, no controller involvement may be necessary.

When replicas receive data, they send IACK indicating receipt of input data. When segment controller monitoring IACKs from replicas determines all replicas received certain input in the order sent, it sends out an IACK on behalf of the segment and initiates a client ACK. This IACK works as an acknowledgement to replicas that they pass the data to application socket or take any necessary actions atomically. Election of segment controller is round-robin per request or static to a select replica like the one with lowest replica ID.

Node Based Group-to-Group Communication

Figure 7A:
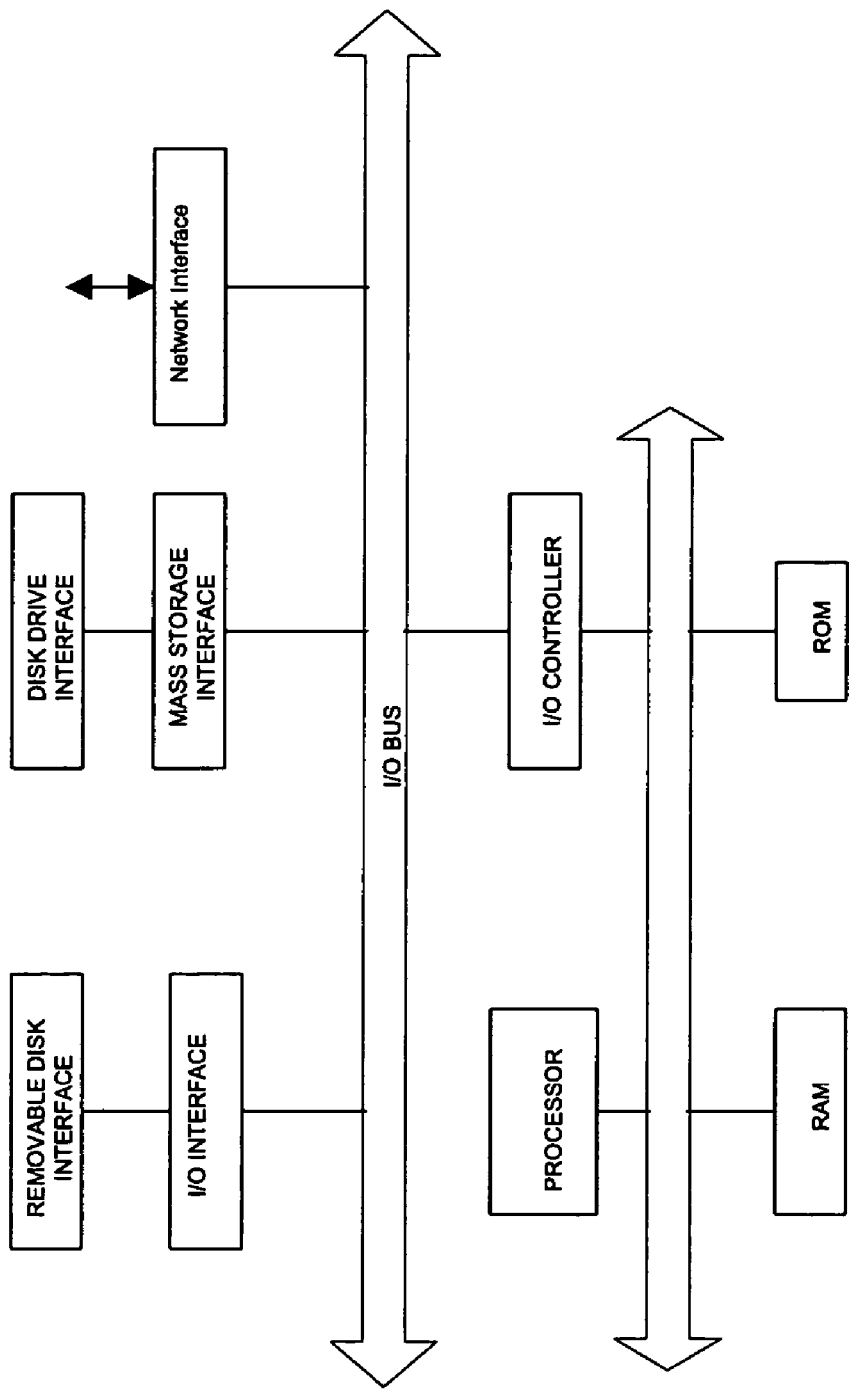
FIG. 7a illustrates a block diagram of a computing system for a communication system in accordance with one embodiment of the present invention.

Referring to FIG. 7a, it is a block diagram of a general computer and its elements suitable for implementing elements of invention. Here the group-to-group communication stack is executed by the processor(s) in the system.

Group-to-Group Communication Offloading the Main CPU

Figure 7B:
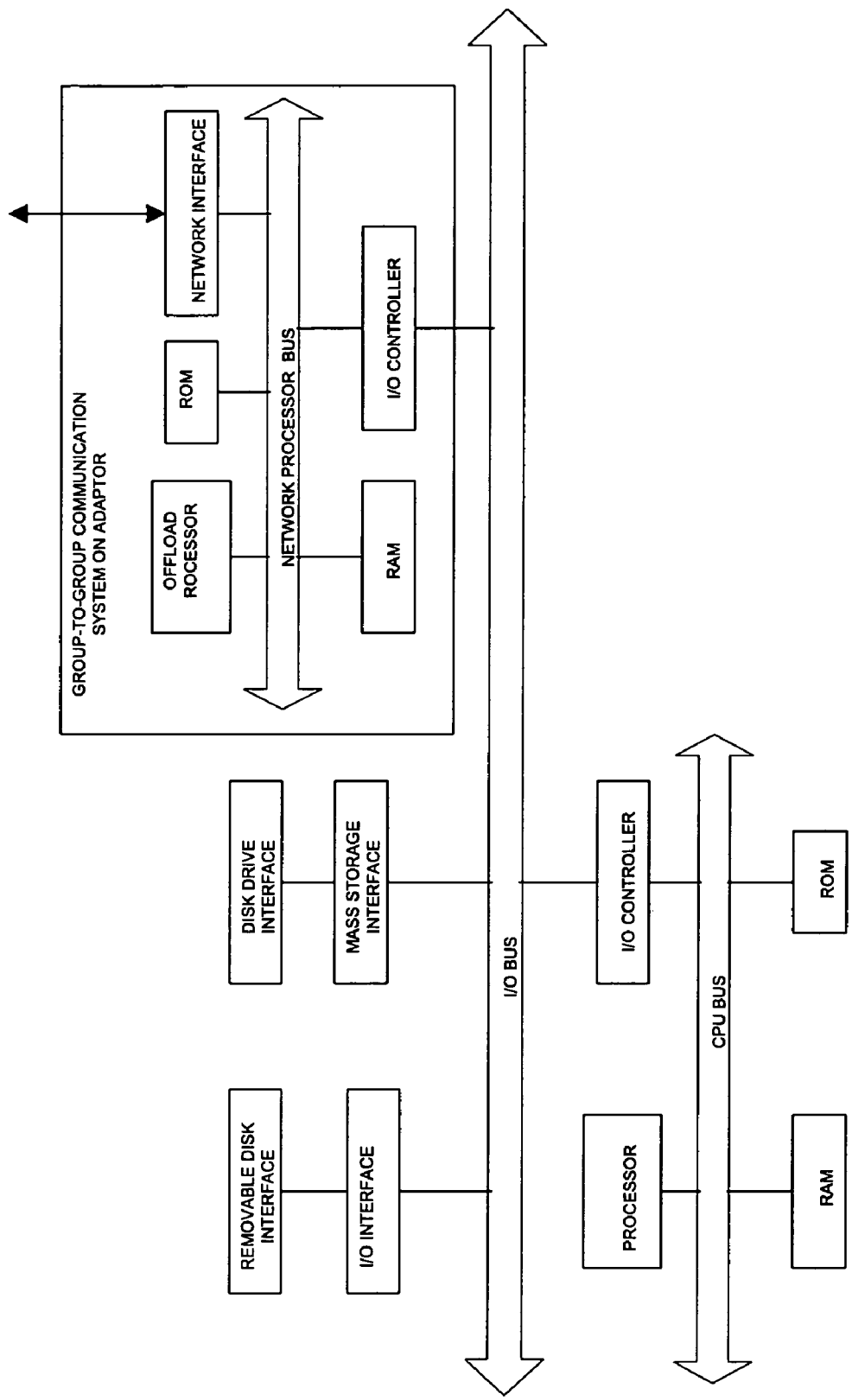
FIG. 7b illustrates a block diagram of a computing system for a communication system having providing offloading of a main processor in accordance with one embodiment of the present invention.

Referring to FIG. 7b, it is a block diagram of a computer and its elements suitable for implementing elements of invention while offloading main processor from processing certain elements. The group-group communication stack is offloaded to an adaptor card with it own processor.

Group-to-Group Communication on Integrated Circuits

Figure 7C:
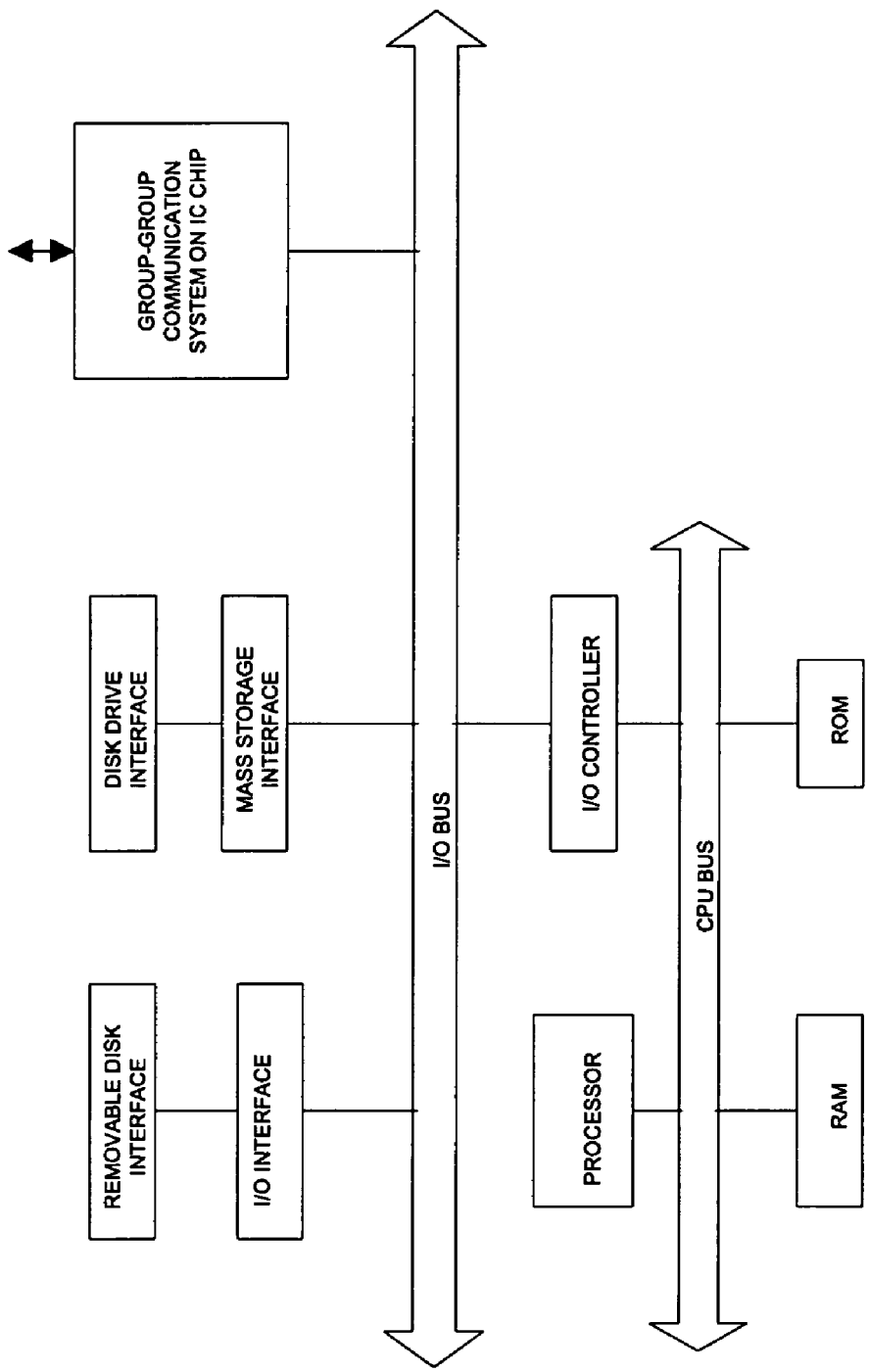
FIG. 7c illustrates a block diagram of a computing system for a communication system providing offloading of a main processor to dedicated hardware/accelerator chips in accordance with one embodiment of the present invention.

Referring to FIG. 7c, it is a block diagram of a computer and its elements suitable for implementing elements of invention while offloading main processor from processing certain elements of invention to dedicated hardware/accelerator integrated chips. The offloads most of the processing required otherwise by the main CPU by implementing the group-group communication stack fully or partially.

Figure 8:
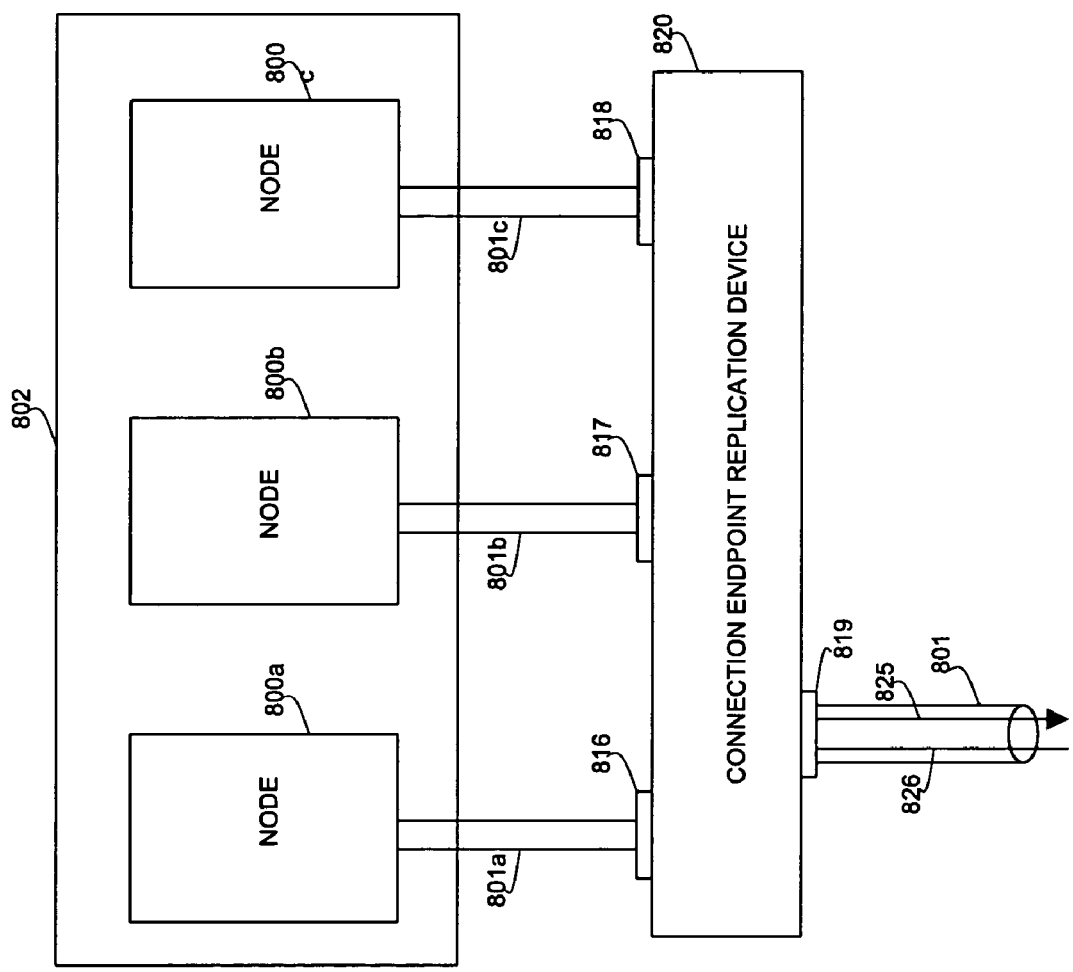
FIG. 8 illustrates an alternate and generalized diagram of communication system in accordance with one embodiment of the present invention.

Referring to FIG. 8, illustrated is an alternative embodiment for the present invention. In this embodiment, a hardware device replicates a single TCP connection end point into multiple end points. The node group is represented by 802. The connection (801) has input stream 826 and output stream 825 respectively. The device (820) here is external to the nodes 800a,b,c. Each server nodes have connection end points 801a,b,c of the same connection 801. The device 820 replicates a single connection 801 into three (801a,b,c) end points on nodes 800. The device 820 has four ports 816, 817, 818, 819 of while port 819 is linked to the connection to peer device. This devices is a potential single point of failure and adds extra network hop.

Figure 9:
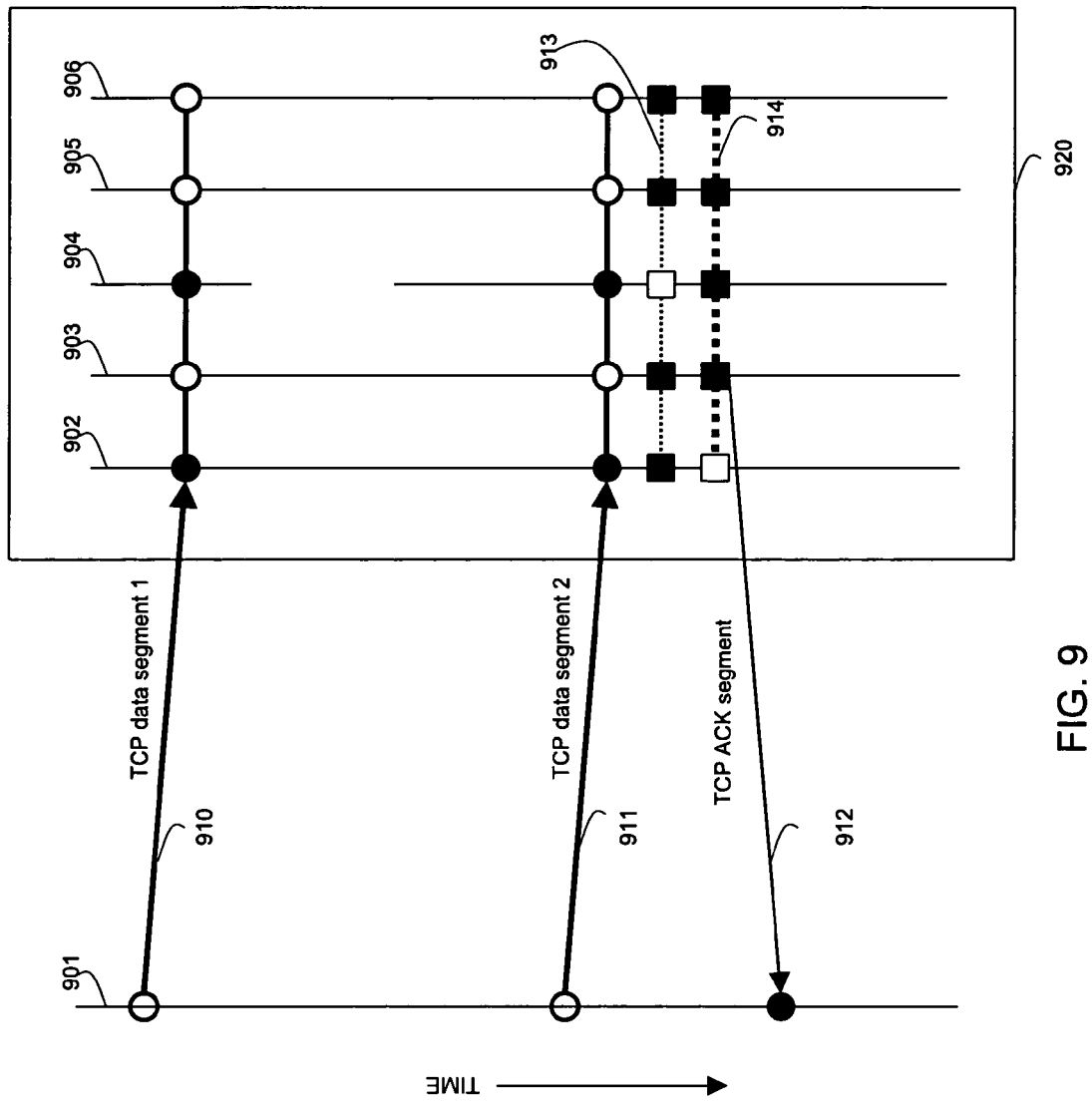
FIG. 9, illustrates a data delivery and acknowledgement scheme between a client group and a server group in accordance with one embodiment of the present invention.

Referring to FIG. 9, illustrated is an atomic data delivery and acknowledgement scheme between a client group and a server group where two data segments 910 and 911 must be delivered to two nodes 902 and 904. The 901 represent the client group and 902, 903, 904, 905 and 906 represent server group nodes. The 910 and 911 represent TCP the data segments sent by client group 901. Though 910 and 911 is potentially available at all server group nodes, however it is only delivered to nodes 902 and 904 as determined by the input filtering system in this instance that may be programmed. Segment 912 represents the TCP ACK segment sent out to the client group from the server group sendHead 903. At the arrival of data segment 910, no TCP ACK segment is sent out, but at the arrival of the second data segment an ACK segment is sent out to client by the server group as per TCP specifications where alternate packets should be acknowledged.

The plex controller 902 sends IACK signal 914 indicating atomic delivery only at the receipt of 913 PIACK (Plex IACK) signal indicating that the acknowldegment of same data segments at the required plex/replica 904. The 902 does not send a PIAK since it is the controller responsible for sending IACK indicating atomic delivery of said data. 903 having the sendHead upon receiving the IACK signal 914 sends out, TCP ACK segment 912 to client group. In addition to sending client ACK segments at the arrival of alternate TCP segments, ACK segment may optionally be sent out at the end of every complete request input. Also client ACK segment is sent out upon detecting exception conditions such as out of order segment arrival, timeout waiting for segment etc. so that client and server groups sync-up and retransmit quickly upon lost TCP segments. Should a server node fail to receive an IACK it sent PIACK for, it retransmits the PIACK and the active receiveHeads responds with another IACK indicating the latest sequence of input data it admitted in to node.

Figure 10:
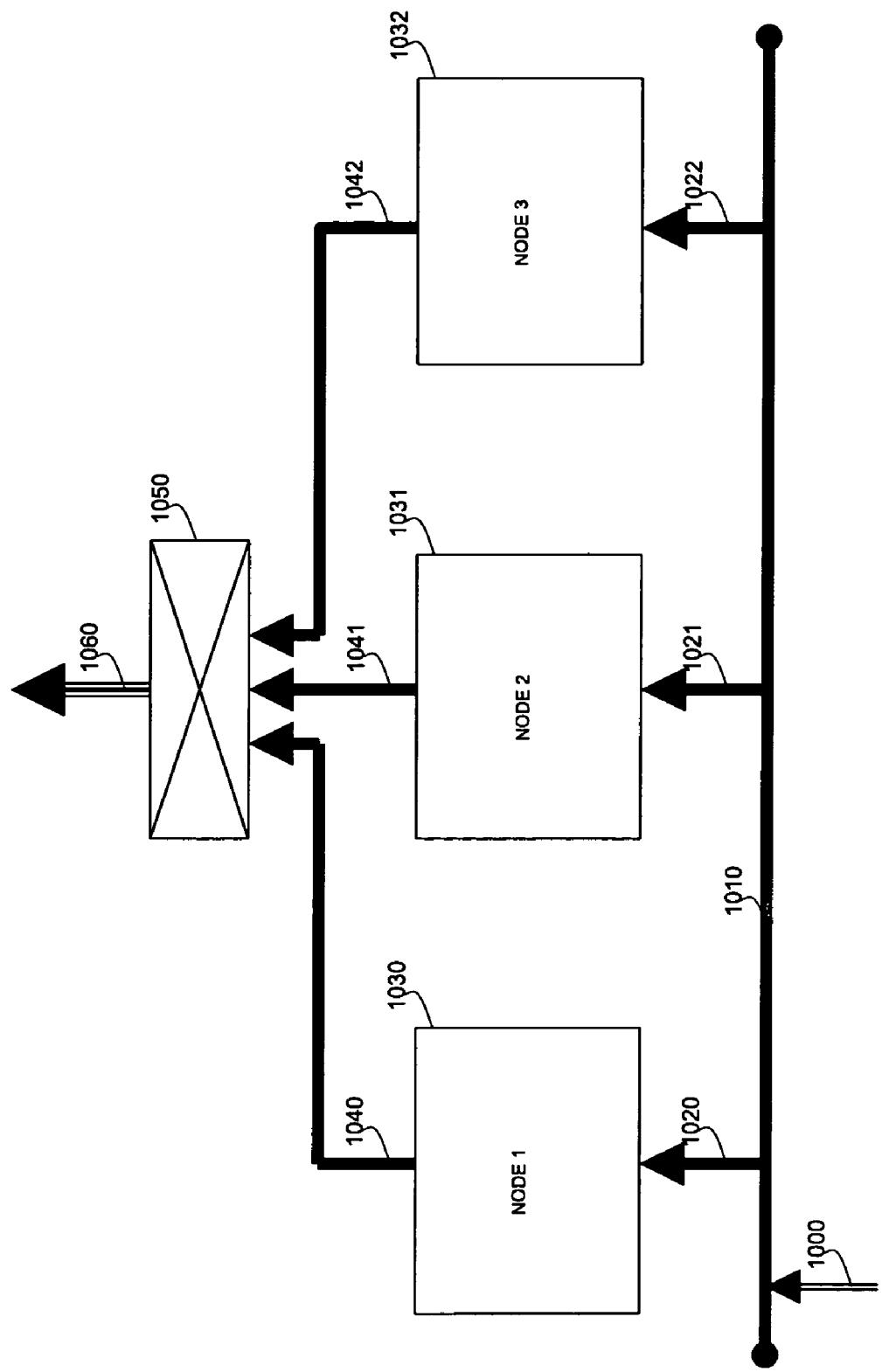
FIG. 10, illustrates a logical view of an implementation in accordance with one embodiment of the present invention.

Referring to FIG. 10, illustrated is a logical view of an implementation where input data is shared as in a bus however the output data is switched. The 1000 is the input data stream from the peer group. The 1010 is a logical half-bus where only input is shared using multicast or a shared media such as Ethernet. The 1020, 1021 and 1022 represent the bus input end-points to the nodes 1030, 1031 and 1032 respectively. The 1040, 1041 and 1042 are the output end points that get fed into a layer 2 or layer 3 IP switching device 1050. The 1060 represent the aggregate output produced by the nodes 1030, 1031 and 1032 produced for input 1000. The 1000 and 1060 respectively forms input and output of a single connection.

Upon reading this disclosure, those of skill in the art will appreciate still additional alternative structural and functional designs for group to group communication over a single connection, in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

I claim:

1. A system for bidirectional data communication between groups in a network, the system comprising:
   a uniquely addressed first group and a uniquely addressed second group, the first group comprising a plurality of endpoints of a single virtual circuit connection established between each of the endpoints of the first group and the second group;
   the plurality of endpoints hosted in a plurality of nodes;
   each of the endpoints comprising an interface so as to be coupled to an application segments hosted in a node; the application segment processing in parallel a subset of data elements targeted at an application; the application comprising a plurality of application segments;
   the virtual circuit connection comprising a first ordered stream and a second ordered stream; the ordered streams comprising ordered data elements, flowing in opposite directions;

the first ordered stream formed after merging a plurality of distinct streams into a single aggregate stream; each of the distinct streams gated by an output filter hosted in a node;

the second ordered stream forked into to a plurality of distinct streams; each of the distinct streams gated by an input filter hosted in a node;

the output filter selectively curbing further conveyance of a set of data elements from an endpoint based on application dependent policies;

the input filter selectively curbing further conveyance of a set of the data elements from the second group to an endpoint based on application dependent policies;

the input filters configured for delivery of a set of data elements to a plurality of application segments; and the output filters configured for reducing a set of data elements from a plurality of endpoints in to a single data element before transmission to the second group.

2. The system of claim 1, wherein bidirectional data communication between each group through the single virtual circuit connection does not pass through an intermediary node of either group.

3. The system of claim 1, wherein an endpoint comprises a protocol stack.

4. The system of claim 1, wherein the first uniquely addressed group and the second uniquely addressed group each consists of a physical host machine or a virtual host machine.

5. The system of claim 1, wherein the aggregate of application segments corresponding to the first group appears as if a single entity to the second group.

6. The system of claim 1, wherein the virtual circuit connection comprises Transmission Control Protocol (TCP).

7. The system of claim 1, wherein each endpoint operates independently of the other endpoints.

8. The system of claim 1, wherein each of the plurality of endpoints filters data arriving over the single logical connection based on whether the data is for an application segment residing in the respective node of the endpoint.

9. A method for bidirectional data communication between groups in a network, the method comprising:

a uniquely addressed first group and a uniquely addressed second group, the first group comprising a plurality of endpoints of a single virtual circuit connection established between each of the endpoints of the first group and the second group;

the plurality of endpoints hosted in a plurality of nodes;

each of the endpoints comprising an interface so as to be coupled to an application segments hosted in a node; the application segment processing in parallel a subset of data elements targeted at an application; the application comprising a plurality of application segments;

the virtual circuit connection comprising a first ordered stream and a second ordered stream; the ordered streams comprising ordered data elements, flowing in opposite directions;

the first ordered stream formed after merging a plurality of distinct streams into a single aggregate stream; each of the distinct streams gated by an output filter hosted in a node;

the second ordered stream forked into to a plurality of distinct streams; each of the distinct streams gated by an input filter hosted in a node;

the output filter selectively curbing further conveyance of a set of data elements from an endpoint based on application dependent policies:

the input filter selectively curbing further conveyance of a set of the data elements from the second group to an endpoint based on application dependent policies;

the input filters configured for delivery of a set of data elements to a plurality of application segments; and the output filters configured for reducing a set of data elements from a plurality of endpoints in to a single data element before transmission to the second group.

10. The method of claim 9, wherein data communication between the groups are such that no said data pass through an intermediary node belonging to either of the groups.

11. The method of claim 9, wherein the aggregate of application segments corresponding to the first group appears as if a single entity to the second group.

12. The method of claim 9, wherein the communication between the groups are in accordance with Transmission Control Protocol (TCP).

13. The method of claim 9, wherein each endpoint operates independently of the other endpoints.

14. The method of claim 9, wherein endpoints are added or deleted from a group during the life of the virtual circuit connection.

15. The method of claim 9, wherein each of the plurality endpoints filters data arriving over the single logical connection based on whether the data is for an application segment residing in the respective node of the endpoint.

* * * * *